US008330992B2

(12) United States Patent
Kuroda

(10) Patent No.: US 8,330,992 B2
(45) Date of Patent: Dec. 11, 2012

(54) PRINTING CONTROL APPARATUS, PRINTING APPARATUS, AND METHODS FOR USE IN THOSE APPARATUSES

(75) Inventor: Shigeki Kuroda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 806 days.

(21) Appl. No.: 12/510,084

(22) Filed: Jul. 27, 2009

(65) Prior Publication Data

US 2010/0027040 A1 Feb. 4, 2010

(30) Foreign Application Priority Data

Jul. 30, 2008 (JP) .................................. 2008-196369

(51) Int. Cl.
*H04N 1/60* (2006.01)
(52) U.S. Cl. ........... 358/1.9; 358/1.5; 358/2.1; 399/341; 347/9
(58) Field of Classification Search ............... 358/1.5, 358/1.9, 2.1, 3.26, 3.27; 399/296, 341, 342; 347/9
See application file for complete search history.

(56) References Cited

U.S. PATENT DOCUMENTS

| 7,236,734 B2 * | 6/2007 | Ng et al. ........................ 399/341 |
| 7,502,582 B2 * | 3/2009 | Ng et al. ........................ 399/341 |
| 7,720,425 B2 * | 5/2010 | Ng et al. ........................ 399/342 |
| 2005/0024399 A1 * | 2/2005 | Fukuda et al. ..................... 347/9 |
| 2006/0133870 A1 * | 6/2006 | Ng et al. ........................ 399/341 |
| 2006/0188301 A1 * | 8/2006 | Ng et al. ........................ 399/341 |
| 2007/0024880 A1 | 2/2007 | Sato |
| 2009/0123204 A1 * | 5/2009 | Ng et al. ........................ 399/341 |
| 2011/0123209 A1 * | 5/2011 | Akita .............................. 399/49 |

FOREIGN PATENT DOCUMENTS

| JP | 2005-328257 A | 11/2005 |
| JP | 2007-033888 A | 2/2007 |

* cited by examiner

*Primary Examiner* — Kimberly A Williams
(74) *Attorney, Agent, or Firm* — Canon U.S.A., Inc., IP Division

(57) ABSTRACT

A printer driver in a host computer (PC/WS) instructs an image input/output apparatus to perform clear toner printing in which color-toner data printed by using a plurality of color toners and clear-toner data printed by using a clear toner are printed in a superimposed relation. Upon accepting an instruction for a test print of the clear toner printing, the printer driver defines a first color and a second color, which differ from each other and which are discernible relative to colors designated in the color-toner data, and issues a printing instruction to the image input/output apparatus such that a portion designated in the clear-toner data where the clear toner is coated by the clear toner printing is printed in the first color, and a portion designated in the clear-toner data where the clear toner is not coated by the clear toner printing is printed in the second color.

26 Claims, 24 Drawing Sheets

FIG. 10

PAGE OPTION — 1001

| CLEAR TONER | PAGE DECORATION | OVERLAY ~1009 |

PROCESSING METHOD
- ○ NOT PERFORM ~1002
- ○ FULL CLEAR TONER PRINTING ~1003
- ● PARTIAL CLEAR TONER PRINTING ~1004

☒ TRIAL PRINTING ~1005

▶ PRINTING ON BOTH REGIONS ~1006
  PRINTING ON BOTH REGIONS
  PRINTING ON REGION WHERE CLEAR TONER IS COATED
  PRINTING ON REGION WHERE CLEAR TONER IS NOT COATED

☐ OUTPUTTING OF INCIDENTAL INFORMATION ~1007

FILE LIST

| NAME | SAVED DATE AND TIME |
|------|---------------------|
| AAA  | 11 / 11 / 2007   11 : 11 |
| BBB  | 11 / 12 / 2007   12 : 12 |
| CCC  | 11 / 13 / 2007   13 : 13 |
| DDD  | 11 / 14 / 2007   14 : 14 |

1008

[ OK ]  [ CANCEL ]  [ HELP ]

FIG. 11

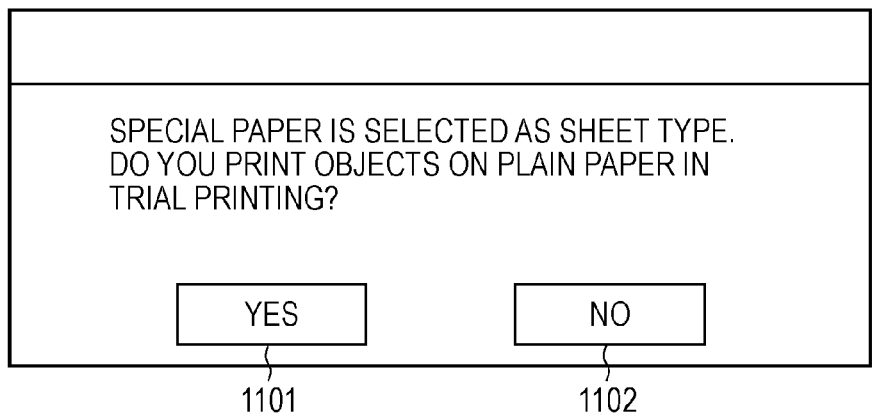

FIG. 12

```
<JOB START>
<START OF DOCUMENT>  ~1201
    DOCUMENT DRAWING DATA   • • • • • • •
                        • • • • • • •   • • • • • • •
                        • • • • • • •   • • • • • • •
<END OF DOCUMENT>  ~1202
<START OF CLEAR TONER PRINTING>  ~1203
        1205~<CLEAR TONER MODE> : PARTIAL PRINTING
1206——<NAME OF CLEAR FORM FILE> : AAA
        1207~<TRIAL PRINTING> : ON
        1208~<TRIAL PRINTING MODE> : PRINTING ON BOTH REGIONS
1209——<OUTPUTTING OF INCIDENTAL INFORMATION> : ON
1210——<FIRST COLOR INFORMATION> : R = 255, G = 255, B = 153
1211——<SECOND COLOR INFORMATION> : R = 199, G = 199, B = 119
        1212~<CHANGE OF SHEET TYPE TO PLAIN PAPER> : ON
1204~<END OF CLEAR TONER PRINTING>
<END OF JOB>
```

| PAGE | R-VALUE | G-VALUE | B-VALUE | NUMBER | (OBJECT LIST) |
|---|---|---|---|---|---|
| 1 | 255 | 173 | 173 | 1 | ............... |
|  | 200 | 200 | 255 | 1 |  |
|  | 100 | 100 | 255 | 1 |  |
|  | 0 | 0 | 255 | 1 |  |
|  | 255 | 0 | 0 | 1 |  |
| 2 | ... | ... | ... | ... |  |

14-b

| ID | R-VALUE | G-VALUE | B-VALUE | CLASSIFICATION | (COMMENT) |
|---|---|---|---|---|---|
| 1 | 255 | 255 | 153 | GLOSSY | BRIGHT YELLOW |
| 2 | 255 | 255 | 0 | GLOSSY | MEDIUM YELLOW |
| 3 | 192 | 192 | 192 | GLOSSY | BRIGHT GRAY |
| 4 | 119 | 119 | 119 | GLOSSY | MEDIUM GRAY |
| 5 | 17 | 17 | 17 | MAT | DARK GRAY |
| 6 | 102 | 51 | 0 | MAT | BROWN |
| 7 | 228 | 168 | 0 | GLOSSY | BRIGHT BROWN |
| 8 | 0 | 102 | 0 | GLOSSY | DARK BROWN |
| ... | ... | ... | ... | ... | ... |

FIG. 18

```
<JOB START>
<START OF DOCUMENT>
    DOCUMENT DRAWING DATA    · · · · · · · ·
                    · · · · · · ·    · · · · · · · ·
                    · · · · · · ·    · · · · · · · ·
<END OF DOCUMENT>
<START OF CLEAR TONER PRINTING>
           <CLEAR TONER MODE> : PARTIAL PRINTING
       <NAME OF CLEAR FORM FILE> : AAA
                <TRIAL PRINTING> : ON
            <TRIAL PRINTING MODE> : PRINTING ON BOTH REGIONS
       <OUTPUTTING OF INCIDENTAL : ON
                    INFORMATION>
       1801 — <OUTPUT STYLE> : PREVIEW OUTPUTTING
         <FIRST COLOR INFORMATION> : R = 255, G = 255, B = 153
        <SECOND COLOR INFORMATION> : R = 199, G = 199, B = 119
         <CHANGE OF SHEET TYPE TO : ON
                    PLAIN PAPER>
<END OF CLEAR TONER PRINTING>
<END OF JOB>
```

PRINTING CONTROL APPARATUS, PRINTING APPARATUS, AND METHODS FOR USE IN THOSE APPARATUSES

BACKGROUND OF THE INVENTION

1. Field of the Invention

The present invention relates to a printing system for executing control of printing that is performed by using a plurality of color toners and a clear toner.

2. Description of the Related Art

In an increasing number of color laser printers, special color toners, such as red and blue toners, have recently been employed in addition to known CMYK (cyan, magenta, yellow and black) toners.

Further, some color laser printers employ a special colorless toner, such as a transparent toner (hereinafter referred to as a "clear toner"), for adjustment of glossiness to provide a print with a gloss or matt finish.

A user can produce output prints having high added values by effectively using clear toner. Regarding color prints, for example, the user can perform full coat printing where the clear toner is coated over the entire print surface, or partial coat printing where the clear toner is partially coated over the print surface.

The full coat printing using the clear toner can protect the printed surface of a sheet and can give a gloss thereto by printing the clear toner over the entire surface of the sheet, which has been subjected to color printing. Also, the partial coat printing using the clear toner can be variously used to provide a partial gloss or partial decoration by partially printing the clear toner over the surface of a sheet, which has been subjected to color printing.

The partial clear toner printing can be performed by a method using a form overlay. According to that method, data for the clear toner (i.e., clear form data), which is required to perform the clear toner printing, is first registered as a form file, referred to as a clear form file, in a printing apparatus by a printer driver installed in an information processing apparatus. Then, when the clear toner printing is actually executed, a print job is sent which includes designation of the registered clear form data. Finally, when the printing apparatus prints the print job and the designated clear form data in a combined (superimposed) manner, an object contained in the clear form data is printed by using the clear toner. The partial clear toner printing can be thus realized.

However, when clear toner printing is performed by the printing apparatus, in certain instances an output print may differ from the intention of an operator, with respect to the chosen registered clear form data, because in practice the clear toner may not be coated on an image data object having a density smaller than a predetermined threshold. Image data having a value smaller than the density threshold (i.e., having a lighter color) is preferably not coated with the transparent toner (clear toner) because, for example, the clear toner coating may make little visible difference when coated on such an object.

Clear toner printing is also chargeable or billable in addition to billing for the color printing, etc. It is therefore advantageous if the operator is able to perform a test print (also called a "trial printing function") without actually using the clear toner in the test print, for the purpose of confirming the overlapped state (position) of a glossy region and the effect (glossy- or matt expression).

Japanese Patent Laid-Open No. 2005-328257 describes a method of, in a trial copy mode for form superimposition, designating a form, designating a density of the form, and printing the form and an original document in a superimposed manner. Japanese Patent Laid-Open No. 2007-033888 describes a technique of analyzing the amount of a colorant in a process color used for input image data, and displaying information obtained with the analysis on a preview.

However, the techniques described in those patent documents have the problem that one or more the object(s) having a toner density smaller than the predetermined threshold, on which the clear toner is not coated, cannot be confirmed with respect to the form file. Further, the techniques described in those patent documents have the problem that the operability for a user is not good when the user designates for the full coat printing or the partial coat printing which uses form data.

SUMMARY OF THE INVENTION

An exemplary embodiment of the present invention provides a scheme capable of confirming not only designation for printing of data printed using a clear toner and designation for printing of data printed using color toners, but also an overlapped state of both the printings with good legibility or visual distinctiveness.

According to one exemplary embodiment of the present invention, in a printing control apparatus instructing a printing apparatus to perform clear toner printing in which color-toner data printed by using a plurality of color toners and clear-toner data printed by using a clear toner are printed in a superimposed relation, the printing control apparatus includes an accepting unit configured to accept an instruction for test outputting, such as a test print or preview display, of the clear toner printing, and a control unit configured, upon accepting the instruction for the test outputting by the accepting unit, to define a first color and a second color, which differ from each other and which are discernible relative to colors designated in the color-toner data, and to execute control such that a portion designated in the clear-toner data where the clear toner is coated by the clear toner printing is output in the first color, and a portion designated in the clear-toner data where the clear toner is not coated by the clear toner printing is output in the second color.

According to another exemplary embodiment of the present invention, in a printing control apparatus instructing a printing apparatus to perform clear toner printing using a plurality of color toners and a clear toner, the printing control apparatus includes a display unit configured to control display of a screen for, when the clear toner printing is performed, prompting a user to select one of full clear designation that printing using the clear toner is performed on an entire surface of a printed page, and partial clear designation that the printing using the clear toner is performed on part of the printed page, and to control display of a screen for, upon the partial clear designation being selected on the aforementioned screen, displaying a list of data files registered in the printing apparatus such that a data file used in the clear toner printing can be selected from the list, a generation unit configured, when the full clear designation is selected on the screen displayed by the display unit, to generate a job including color-toner data printed by using the color toners and information indicating the full clear designation, and when the partial clear designation is selected on the screen displayed by the display unit, to generate a job including the color-toner data, information indicating the partial clear designation, and information regarding the data file which has been selected on the screen displayed by the display unit to be used in the clear toner printing, and a transmission unit configured to send the job generated by the generation unit to the printing apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 illustrates an example of a user interface enabling various settings for page option to be performed in the printer driver.

FIG. 11 illustrates an example of a popup message displayed in S911 of FIG. 9.

FIG. 12 illustrates an example of details of print data (job) sent from the printer driver in S922 of FIG. 9.

FIG. 14 is a table showing examples of a color information list for the print data and a color list for a clear form.

FIG. 18 illustrates an example of details of the print data in which the preview outputting is set as the output style.

DESCRIPTION OF THE EMBODIMENTS

First Exemplary Embodiment

Exemplary embodiments of the present invention will be described, merely by way of example, in detail below with reference to the drawings. Be it noted that relative layout of components, numerical values, etc. described in the following exemplary embodiments should not be construed as limiting the scope of the invention thereto unless otherwise specified.

Figure 1:
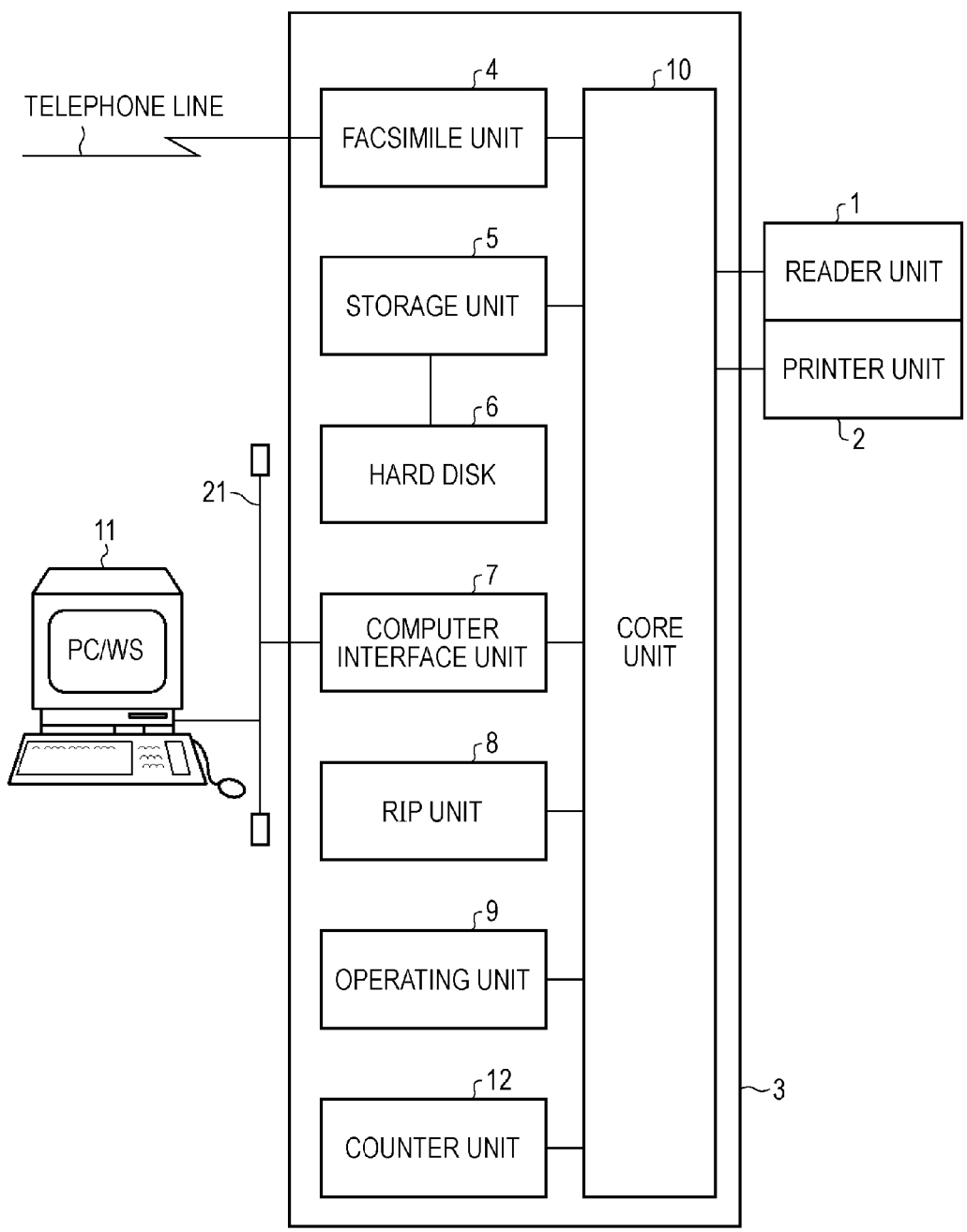
FIG. 1 is a block diagram of a printing system according to a first exemplary embodiment of the present invention.

FIG. 1 is a block diagram of a printing system according to a first exemplary embodiment of the present invention.

Referring to FIG. 1, an image input/output apparatus 3 is connected to a reader unit 1 and a printer unit 2.

The reader unit 1 reads an image of an original document and outputs image data corresponding to the document image to the image input/output apparatus 3. The printer unit 2 records (prints), on a sheet of recording paper, an image corresponding to the image data from the image input/output apparatus 3.

The image input/output apparatus 3 includes a facsimile unit 4, a storage unit 5, a computer interface unit 7, an RIP (Raster Image Processor) unit 8, an operating unit 9, a core unit 10, a counter unit 12, and so on.

The facsimile unit 4 decompresses compressed image data received via a telephone line and transfers the decompressed image data to the core unit 10. Also, the facsimile unit 4 compresses image data transferred from the core unit 10 and sends the compressed image data via the telephone line. The image data sent from and received by the facsimile unit 4 can be temporarily stored in a hard disk 6 connected to the storage unit 5.

The hard disk 6 is connected to the storage unit 5, and the storage unit 5 compresses image data transferred from the core unit 10 and stores the compressed image data together with an image data ID number used to search for the relevant image data.

Further, the storage unit 5 searches for the compressed image data, stored in the hard disk 6, in accordance with code data transferred from the core unit 10. The storage unit 5 then reads and decompresses the compressed image data found by the search and transfers the decompressed image data to the core unit 10.

Still further, the storage unit 5 can store, in the hard disk 6, image data transferred from the core unit 10 together with storage attributes of the relevant image. The image data stored together with the storage attributes is stored in the hard disk 6 without being immediately transferred to the core unit 10. The storage attributes are instructed from the PC/WS 11 through the computer interface unit 7 (described below) together with a print job. The stored image data can be output to be transferred to the core unit 10 in accordance with an instruction from an operator through the operating unit 9, or with an instruction in code data (PDL) received through the computer interface unit 7.

The computer interface unit 7 serves as an interface between the PC/WS 11, which is a computer (information processing apparatus) such as a personal computer or a workstation, and the core unit 10. The computer interface unit 7 is connected to the PC/WS 11 (hereinafter referred to as a "host computer 11") via a communication medium 21 (e.g., a one-to-one local interface or a network) in a two-way communicable manner. The print job from the host computer 11 is, as described above, received by the computer interface unit 7 and transferred to the core unit 10.

The computer interface unit 7 is able to communicate with the host computer 11 in a two-way manner. For example, the computer interface unit 7 can send, as device information, print job information, various setting information, the state of the image input/output apparatus, etc., which are managed by the core unit 10, to the host computer 11. The device information is sent to the core unit 10 from the reader unit 1 or the printer unit 2 and is sent to the host computer 11 through the computer interface unit 7. At that time, an inquiry for acquiring the device information is delivered from the host computer 11 to the computer interface unit 7 via the network, for example.

On that occasion, the computer interface unit 7 inquires the core unit 10 of device information, withdraws the information from the core unit 10, and sends the information to the host computer 11 via, e.g., the network. Here, a process in which the host computer 11 inquires the relevant device of current information and acquires the information is called "dynamic configuration".

In some cases, an inquiry delivered from the host computer 11 for acquiring the device information does not reach the computer interface unit 7 via, e.g., the network. Even in such a case, the core unit 10 takes an action to send device information, and the computer interface unit 7 withdraws the information at the timing of the action. The information is then sent to the host computer 11 via, e.g., the network. A process in which the core unit 10 takes an action to send information and the image input/output apparatus 3 sends the information by itself to the host computer 11, thus causing a printer driver in the host computer 11 to acquire the sent information, is called "auto-configuration" using WSD. The acronym "WSD" implies Device Profile for Web Service.

The RIP unit 8 develops code data (PDL) representing an image, which has been transferred from the host computer 11, into image data capable of being recorded in the printer unit 2.

The operating unit 9 includes a touch panel display and hard keys such that an operation instruction and operation setting for the image input/output apparatus 3 and setting of sheet information, etc. can be performed through a user interface. The operating unit 9 can also instruct re-outputting or deletion of image data stored in the storage unit 5 together with the storage attributes.

The counter unit 12 is a counter displaying the number of prints for the purpose of billing.

The core unit 10 controls, though described in more detail later, flows of data among the reader unit 1, the printer unit 2, the facsimile unit 4, the storage unit 5, the computer interface unit 7, the RIP unit 8, the operating unit 9, and the counter unit 12.

Figure 2:
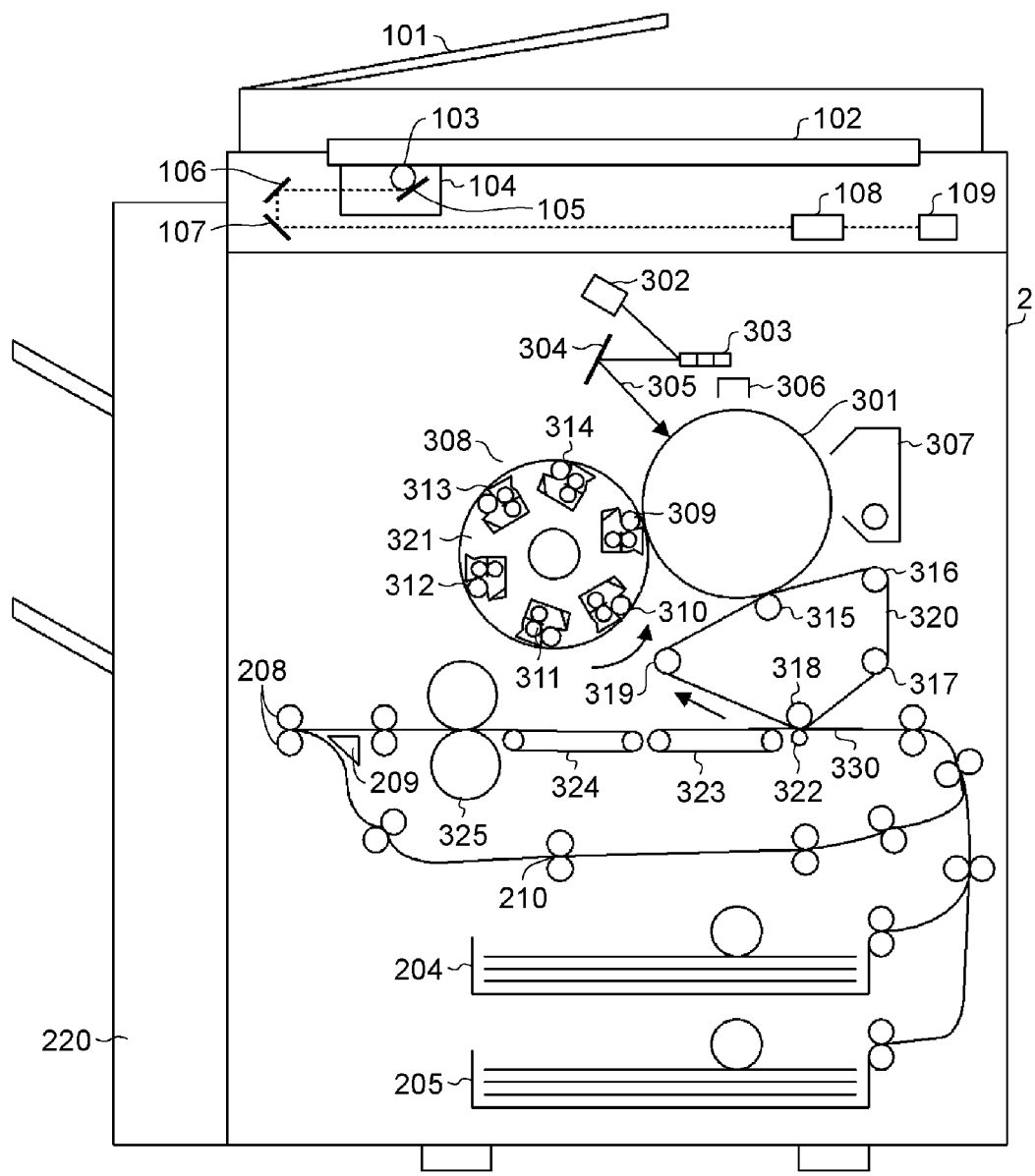
FIG. 2 is a sectional view of a reader unit and a printer unit illustrated in FIG. 1.

FIG. 2 is a sectional view of the reader unit 1 and the printer unit 2 illustrated in FIG. 1.

As illustrated in FIG. 2, a document feeder 101 in the reader unit 1 feeds documents set on a document plate onto a platen glass 102 one by one successively from the top one of the documents. After the end of the document reading operation, the document on the platen glass 102 is discharged.

When the document is conveyed onto the platen glass 102, a lamp 103 is turned on and a scanner unit 104 is started to move for scanning exposure of the document. Light reflected from the document is introduced to a CCD image sensor (hereinafter referred to as a "CCD") 109 through mirrors 105, 106 and 107 and a lens 108. Thus, an image of the scanned document is read by the CCD 109. Image data output from the CCD 109 is subjected to predetermined processing and is then transferred to the core unit 10 in the image input/output apparatus 3.

The printer unit 2 includes a drum-shaped electrophotographic photosensitive member, i.e., a photosensitive drum 301, which serves as an image bearing member. Around the photosensitive drum 301, there are arranged a charger 306 as a charging unit, a laser beam source 302 as an exposure unit, a polygonal mirror 303 for reflecting an optical image 305 irradiated from the laser beam source 302, and a mirror 304.

Further, a cleaner 307 as a cleaning unit and a rotary developing apparatus 308 are also arranged around the photosensitive drum 301.

In an opposed relation to the photosensitive drum 301, an intermediate transfer belt 320 is arranged which serves as an intermediate transfer member, i.e., a second image bearing member, stretched over rollers 316, 317, 318 and 319.

The rotary developing apparatus 308 has a rotating member, i.e., a developing rotary 321, which is arranged in an opposed relation to the photosensitive drum 301 and is rotatably supported. The developing rotary 321 mounts thereon, as a plurality of developing units, developers for color toners of five colors and one colorless toner. The developers are a yellow toner developer 309, a magenta toner developer 310, a cyan toner developer 311, a black toner developer 312, a light black toner developer 313, and a transparent toner (clear toner) developer 314 for adjustment of glossiness.

In forming a full-color image, for example, the surface of the photosensitive drum 301 is first charged by the charger 306. Then, the printer unit 2 irradiates the optical image 305 from the laser beam source 302 to the charged surface of the photosensitive drum 301 in accordance with, e.g., an image signal sent from the core unit 10 in the image input/output apparatus 3. An electrostatic image (latent image) is thus formed on the photosensitive drum 301.

The latent image is developed by the rotary developing apparatus 308. More specifically, the developing rotary 321 is rotated in the direction indicated by an arrow and a predetermined developer of the rotary developing apparatus 308, e.g., the developer 309, is moved to a developing region opposed to the photosensitive drum 301. Then, a developing-agent image, i.e., a toner image, is formed on the photosensitive drum 301 with the operation of the developer 309.

Thereafter, the toner image formed on the photosensitive drum 301 is transferred onto the intermediate transfer belt 320 in a region (primary transfer region) where the photosensitive drum 301 and the intermediate transfer belt 320 are opposed to each other. The transfer of the toner image is performed by the action of a primary transfer bias applied to a primary transfer roller 315 that serves as a primary transfer unit.

With repetition of the above-described operation, a multi-toner image is formed on the intermediate transfer belt 320, the multi-toner image including the yellow toner, the magenta toner, the cyan toner, the black toner, and the light black toner which are overlaid (superimposed) in sequence. Finally, the clear toner is overlaid at the top with the intent to improve an effect of enhancing, e.g., a gloss of the multi-toner image.

The multi-toner image formed on the intermediate transfer belt 320 is transferred onto a recording material 330 in a region (secondary transfer region) where a secondary transfer roller 322 serving as a secondary transfer unit and the intermediate transfer belt 320 are opposed to each other, by the action of a secondary transfer bias applied to the secondary transfer roller 322. The recording material 330 is conveyed to the secondary transfer region from a recording material supply section (not shown) in match with the timing at which a leading end of the multi-toner image on the intermediate transfer belt 320 is conveyed to the secondary transfer region.

The recording material 330 onto which the toner image has been transferred is conveyed to a roller fuser 325, serving as a fusing unit, by conveying belts 323 and 324. The recording material 330 is pressed and heated by the roller fuser 325 such that the toner image is fused as a permanent image on the recording material 330. The recording material 330 is then discharged to the outside by a discharge roller 208.

When duplex recording is set, the rotating direction of the discharge roller 208 is reversed after the recording material (paper) has been conveyed to the discharge roller 208, whereby the recording material is introduced to a refeeding path 210 by a flapper 209. The recording material introduced to the refeeding path 210 is fed again to the secondary transfer roller 322, i.e., the secondary transfer unit, at the same timing as that described above.

The toner remaining after the primary transfer, i.e., the toner remaining on the photosensitive drum 301 after the primary transfer step, is removed by the cleaner 307. Further, the toner remaining after the secondary transfer, i.e., the toner remaining on the intermediate transfer belt 320 after the secondary transfer step, is removed by a transfer belt cleaner (not shown).

Reference numeral 220 denotes a paper discharging section and a paper discharging apparatus, often called a finisher option, in which the recording materials discharged by the discharge roller 208 are subjected to treatment, e.g., stapling or punching, as required, before they are discharged to the outside of an image forming apparatus. The treated recording materials are discharged to, e.g., a paper discharge tray in the paper discharging apparatus.

Figure 3:
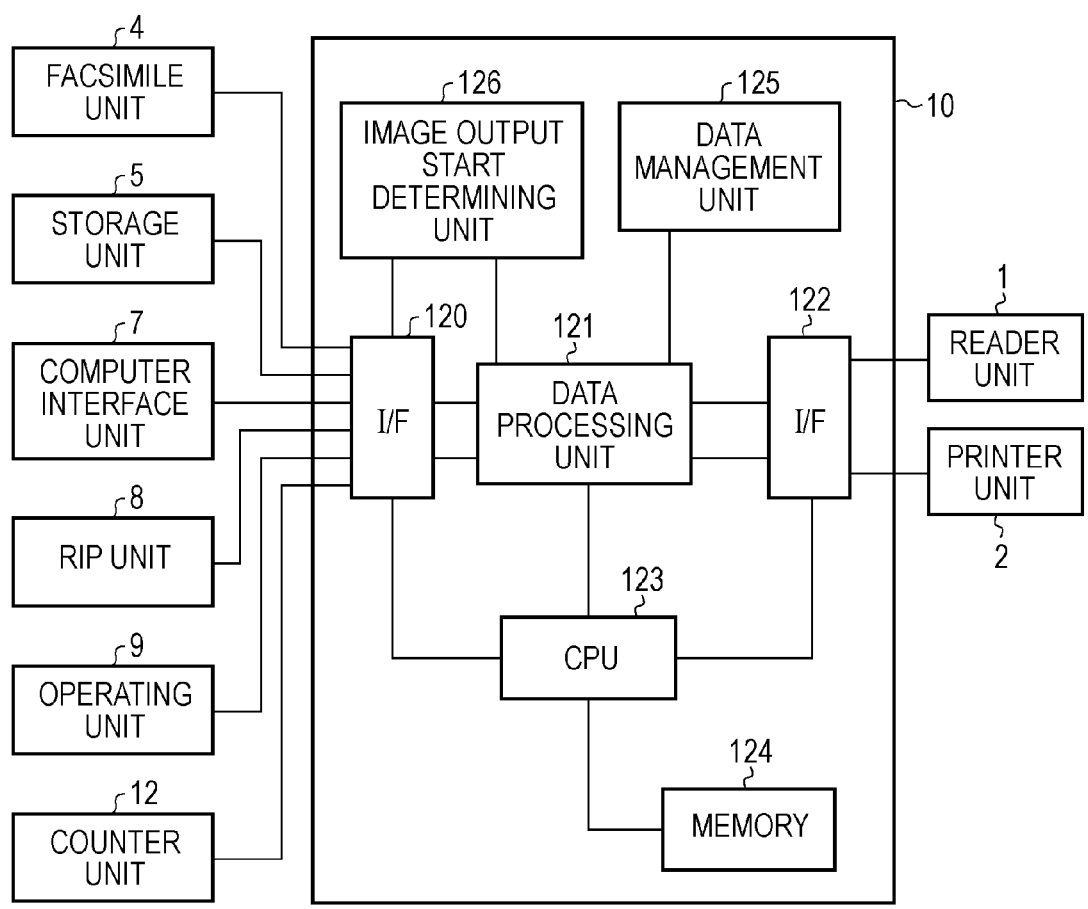
FIG. 3 is a block diagram of a core unit illustrated in FIG. 1.

FIG. 3 is a block diagram of the core unit 10 illustrated in FIG. 1.

As illustrated in FIG. 3, the image data from the reader unit 1 is transferred to a data processing unit 121 through an interface (I/F) 122. The data processing unit 121 executes not only image processing, such as processes for rotating and scaling-up or -down an image, but also compression and decompression of image data. The data processing unit 121 has therein a page memory with capacity corresponding to image data for plural pages of A4/Letter size.

The image data transferred to the data processing unit 121 from the reader unit 1 is temporarily stored in the page memory within the data processing unit 121, and is then transferred to the storage unit 5 through an interface (I/F) 120 after being compressed.

The code data (PDL) representing the image input through the computer interface unit 7 is transferred to the data processing unit 121 through the interface 120 and then transferred to the RIP unit 8 for development into image data. Further, the image data is transferred to the data processing unit 121 to be temporarily stored in the page memory within the data processing unit 121, and is then transferred to the storage unit 5 after being compressed. In the storage unit 5, the image data is stored and managed in accordance with the image data ID number that has been defined by the data processing unit 121.

The image data withdrawn from the storage unit 5 is transferred to the data processing unit 121 to be temporarily stored in the page memory within the data processing unit 121 after being decompressed, and is then transferred to the printer unit 2, the facsimile unit 4, or the computer interface unit 7.

As soon as the image data is stored in the storage unit 5, that event is immediately notified to a data management unit 125 and is managed in the data management unit 125 in relation to the image data ID number that has been defined by the data processing unit 121. The data management unit 125 further manages the print job, which has been stored in the hard disk 6 at the same time, in relation to the print job ID number.

At a point in time after various image data have been input to the data processing unit 121 to be temporarily stored in the page memory, but before the image data is transferred to the storage unit 5, the image data can also be transferred to the printer unit 2, the facsimile unit 4, or the computer interface unit 7. Such transfer of the image data can be performed by selectively switching over an internal selector.

The amount of page data having been processed in the data processing unit 121 is also counted when the page data is transferred to the printer unit 2 or the facsimile unit 4. Here, the term "amount of page data" implies, e.g., the number of jobs, the number of pages transferred per job, and the number of sheets actually printed. Further, when high-quality image data is generated, or when a special processing, such as clear toner printing, is performed, the number of jobs transferred and the number of pages printed in the special processing are further counted. The counted data is managed in the data management unit 125. The thus-counted data is displayed on the counter unit 12 through the interface 120.

A CPU 123 executes the above-described control in accordance with control programs stored in a memory 124 and control commands transferred from the operating unit 9. The memory 124 is also used as a working area for the CPU 123.

A process of storing the image in the storage unit 5 together with the storage attributes of the relevant image will be described in more detail below. The storage attributes are instructed from the host computer 11 through the computer interface unit 7 together with the code data (PDL). Various storage attributes (such as a box storage attribute, a form file storage attribute, and a clear form file storage attribute) are described one by one.

<Box Storage Attribute>

As one of the storage attributes stored together when the image is stored in the storage unit 5, there is a storage attribute enabling the image to be transferred to the core unit 10 for printing in accordance with an operator instruction input later from the operating unit 9. Such a storage attribute is called the "box storage attribute", and a file stored at that time is called a box storage file.

A box storing process will be described below.

Image data stored together with the box storage attribute is provided as code data (PDL), which is received by the computer interface unit 7 and which indicate therein, for example, the document name of the stored file and the box number representing the image data.

The data processing unit 121 determines whether the box storage attribute is designated as the storage attribute in the code data (PDL). If the box storage attribute is instructed, the data processing unit 121 instructs an image output start determining unit 126 not to immediately transfer the code data (PDL) to the printer unit 2, the facsimile unit 4, or the computer interface unit 7.

Then, the code data (PDL) is transferred to the RIP unit 8 and is developed into image data. The image data is transferred to the data processing unit 121 to be temporarily stored in the page memory and is further transferred to the storage unit 5 after being compressed. In the storage unit 5, the compressed image data is stored together with the document name of the stored file and the image data ID number defined by the data processing unit 121.

The storage unit 5 can store those data in an area for the box storage. The image data stored in the storage unit 5 is stored at the destination designated by a box number corresponding to the box storage file. The term "box number" represents, as a number, a place in a storage area where the image data is to be stored. The box number and the document name of the stored file can be displayed on the operation unit 9.

A box document printing process will be described below.

By instructing the box number and the document name of the stored file through the operating unit 9 after the above-described box storing process, the operator can output the stored image data (box storage file). On that occasion, the designated image data is transferred from the storage unit 5 to the data processing unit 121. The data processing unit 121 instructs the image output start determining unit 126 to immediately output the image data. The image data transferred to the data processing unit 121 is decompressed and temporarily stored in the page memory and is then transferred to the printer unit 2, the facsimile unit 4, or the computer interface unit 7.

<Form File Storage Attribute>

As another one of the storage attributes stored together when the image is stored in the storage unit 5, there is a storage attribute enabling the image to be transferred to the core unit 10 for superimposed printing with the code data (PDL) in accordance with an instruction in the code data (PDL) that is received later through the computer interface unit 7. Such a storage attribute is called the "form file storage attribute", and a file stored at that time is called a form file.

A form file storing process will be described below.

Image data (form file) stored together with the form file storage attribute is provided as code data (PDL), which is received through the computer interface unit 7 and which indicates therein, for example, the document name of the stored form file.

The data processing unit 121 determines whether the form file storage attribute is designated as the storage attribute in the code data (PDL). If the form file storage attribute is designated, the data processing unit 121 instructs the image output start determining unit 126 not to immediately transfer the code data (PDL) constituting the form file to the printer unit 2, the facsimile unit 4, or the computer interface unit 7.

Then, the code data (PDL) constituting the form file is subjected to similar processing to that in the above-described box storing process (i.e., it is developed into image data in the RIP unit 8 and is then compressed in the data processing unit 121). Thereafter, the form file is transferred to the storage unit 5 in which the compressed image data is stored together with the document name of the stored form file and the image data ID number defined by the data processing unit 121.

In the storage unit 5, the form file can be stored in an area dedicated for the form file.

A form file superimposing (overlay printing) process will be described below.

After the above-described form file storing process, the operator can instruct the overlay printing from the host computer 11 through the computer interface unit 7.

On that occasion, the operator instructs not only the code data (PDL), but also the overlay printing (superimposition) of the stored form file with the code data (PDL). In such a case, the name of the form file to be superimposed is designated in the code data (PDL).

The code data (PDL) is transferred to the data processing unit 121 through the interface (I/F) 120 and then transferred to the RIP unit 8 for development into image data. The image data is transferred to the data processing unit 121 and is temporarily stored in the page memory. Then, the file (form file) corresponding to the name of the form file designated in the code data (PDL) is invoked from the storage unit 5 through the I/F 120. The form file (image data) invoked from the storage unit 5 is transferred to the data processing unit 121. After the form file (image data) is overlaid on (superimposed with) the image data temporarily stored in the page memory, resulting data is output to be transferred to the printer unit 2, the facsimile unit 4, or the computer interface unit 7.

<Clear Form File Storage Attribute>

As still another one of the storage attributes stored together when the image is stored in the storage unit 5, there is a storage attribute enabling the image to be transferred to the core unit 10 for clear toner printing, i.e., superimposition of the clear toner with the code data (PDL), in accordance with an instruction in the code data (PDL) that is received later through the computer interface unit 7. Such a storage attribute is called the "clear form file storage attribute", and a file stored at that time is called a clear form file.

A clear form file storing process will be described below.

Image data (clear form file) stored together with the clear form file storage attribute is provided as code data (PDL), which is received through the computer interface unit 7 and which designates therein, for example, the document name of the stored clear form file.

The data processing unit 121 determines whether the clear form file storage attribute is designated as the storage attribute in the code data (PDL). If the clear form file storage attribute is designated, the data processing unit 121 instructs the image output start determining unit 126 not to immediately transfer the code data (PDL) constituting the clear form file to the printer unit 2, the facsimile unit 4, or the computer interface unit 7.

Then, the code data (PDL) constituting the clear form file is subjected to similar processing to that in the above-described box storing process. Thereafter, the clear form file is transferred to the storage unit 5 in which it is stored together with the document name of the stored clear form file and the image data ID number defined by the data processing unit 121.

In the storage unit 5, the clear form file can be stored in an area dedicated for the clear form file.

The clear toner superimposing (clear toner printing) process for the clear form file will be described below.

After the end of the above-described clear form file storing process, the operator can instruct the clear toner printing from the host computer 11 through the computer interface unit 7.

On that occasion, the operator instructs not only the code data (PDL), but also the clear toner superimposition (clear toner printing) of the stored clear form file with the code data (PDL). In such a case, the name of the clear form file to be superimposed using the clear toner is designated in the code data (PDL).

The code data (PDL) is transferred to the data processing unit 121 through the interface 120 and then transferred to the RIP unit 8 for development into image data. The image data is transferred to the data processing unit 121 and is temporarily stored in the page memory. Then, the file (clear form file) corresponding to the name of the clear form file designated in the code data (PDL) is invoked from the storage unit 5 through the I/F 120. The clear form file (image data) invoked from the storage unit 5 is transferred to the data processing unit 121. Further, the clear form file (image data) is transferred, as image data dedicated for the transparent toner (clear toner) developer 314 illustrated in FIG. 2, to the printer unit 2 or the computer interface unit 7.

The image data temporarily stored in the page memory is transferred, as image data for the color toner developers 309, 310, 311, 312 and 313 illustrated in FIG. 2, to the printer unit 2 or the computer interface unit 7. Thus, the clear toner printing can be performed by using the transparent toner (clear toner) in addition to the color toners.

Processing of the clear form file, which is invoked from the storage unit 5 and transferred to the data processing unit 121, will be described in more detail.

The clear form file stored in the storage unit 5 is provided as color image data composed of, e.g., YMCK.

On the other hand, as described above, the clear form file is used as image data dedicated for the transparent toner (clear toner) developer 314. Accordingly, the image data dedicated for the transparent toner (clear toner) developer 314 is just required to be binary data from the nature of the transparent toner (clear toner).

Therefore, the data processing unit 121 executes a process of binarizing an image of the clear form file transferred thereto. The binarizing process can be executed by using the method practiced in the related art and a detailed description thereof is not repeated here. The clear form file after the binarizing is provided as image data that is expressed by a monochrome space with shades of 0 to 255, for example.

The clear form file after the binarizing (i.e., the binarized form file) is temporarily stored in the memory 124 by the data processing unit 121 through the CPU 123.

Then, the data processing unit 121 invokes the binarized form file stored in the memory 124 and extracts image data having density of not smaller than a density threshold by masking image data having density of smaller than the density threshold.

The term "density threshold" refers to a threshold of density, which is set for the monochrome space of the binarized data. Image data having a value smaller than the density threshold (i.e., having a lighter color) is subjected to, e.g., a process of not coating the transparent toner (clear toner) because the presence of the transparent toner (clear toner) is relatively hard to discern visually for such image data in the output print. When the binarized image data is expressed by the monochrome space with shades of 0 to 255 as described above, the density threshold can take any value in the same range of 0 to 255. In the monochrome space, a gray shade is expressed lighter as the binary value approaches 0 and deeper as it approaches 255. An example of the density threshold will be described below with reference to FIG. 4.

Figure 4:
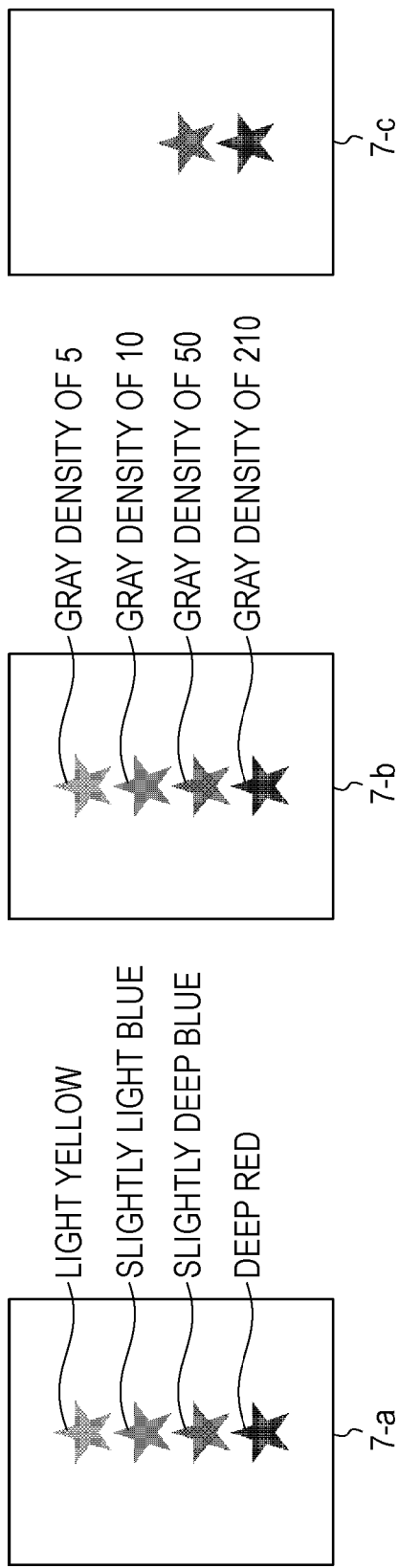
FIG. 4 illustrates an example of a density threshold related to a clear toner form.

FIG. 4 illustrates an example of the density threshold related to the clear toner form.

In FIG. 4, an illustration 7-*a* represents image data in one page of the clear form file. In the example of FIG. 4, an image is made up of four star marks which are expressed respectively light yellow, slightly light blue, slightly deep blue, and deep red from the top.

The data processing unit 121 binarizes the image 7-*a*. An illustration 7-*b* represents an example of image data as a result of the binarizing. In the illustrated example, the image data is binarized into the monochrome gray space with shades of 0 to 255. In this case, 0 corresponds to white and 255 corresponds to black.

For example, the top star mark in 7-*a* represents data expressed "light yellow". As a result of the binarizing process, however, it is converted to data expressed with a gray density of 5. Similarly, the other star marks are also converted to data expressed with a gray density of 10, 50 and 210 successively from the second top.

Also, as seen from 7-*b*, the density threshold is set to 30. Accordingly, when the data processing unit 121 extracts the image data based on the density threshold, the image data having density of smaller than 30 is masked, while only the image data having density of 30 or more is extracted.

An illustration 7-*c* represents an example of the extracted image data. Because the density threshold is set to 30 in 7-*b*, the first star mark having a gray density of 5 and the second star mark having a gray density of 10 are masked, while only the third star mark having a gray density of 50 and the fourth star mark having a gray density of 210 are extracted.

The density threshold is previously defined and stored in the storage unit 5. When the data processing unit 121 extracts the image data having density of not smaller than the density threshold, the data processing unit 121 reads the stored information of the density threshold from the storage unit 5 through the I/F 120 for use in the extraction. The density threshold can also be changed by the operator through the operating unit 9.

Thus, the data processing unit 121 newly sets the image data having density of not smaller than the density threshold as the image data dedicated for the transparent toner (clear toner) developer 314. Further, the data processing unit 121 transfers the image data dedicated for the clear toner developer 314 to the printer unit 2 or the computer interface unit 7 for superimposition with the other image data for the color toner developers 309, 310, 311, 312 and 313.

As described above, the core unit 10 and the other components can execute processing in a combined manner of such functions as reading the document image, printing the image, sending/receiving the image, and storing the image.

Similarly, the core unit 10 and the other components can execute processing in a combined manner of such functions as executing the box storage and the box outputting, the storage and superimposed outputting of the form file, as well as the storage and superimposed outputting of the clear form file.

Figure 5:
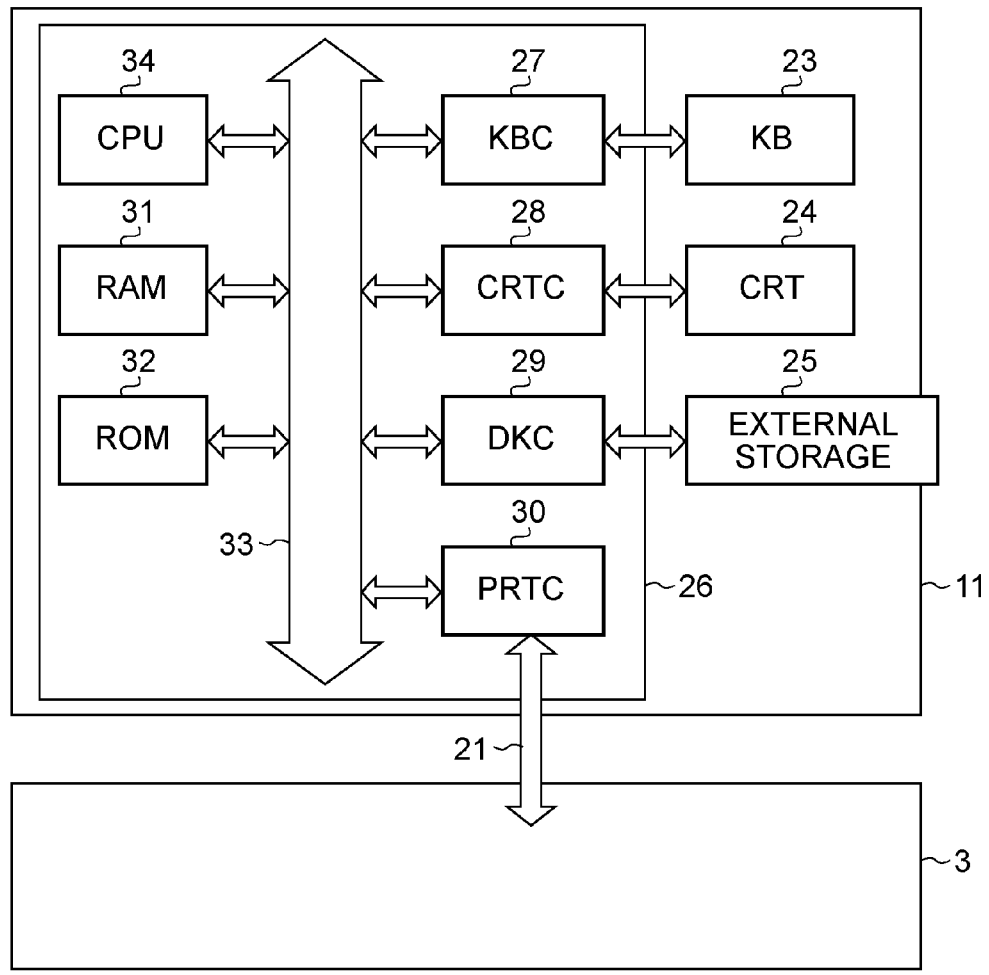
FIG. 5 is a block diagram of a host computer (PC/WS) illustrated in FIG. 1.

FIG. 5 is a block diagram of the host computer (PC/WS) 11 illustrated in FIG. 1. The host computer 11 and the image input/output apparatus 3 are connected to each other via a network 21 for the necessity of two-way communication between them. However, the present invention is also applicable to an information processing system in which the host computer 11 and the image input/output apparatus 3 are connected through a local interface (e.g., USB or IEEE1394) instead of the network 21.

As illustrated in FIG. 5, the host computer 11 includes a keyboard 23 through which the operator can input predetermined data as desired, a display unit (e.g., a CRT as denoted in FIG. 5 or some other suitable type of display) 24 for displaying the predetermined data, etc.

The host computer 11 further includes an external storage 25, e.g., a flexible disk or a hard disk, which stores a boot program, an OS, various application programs, fond data, user files, and editing files. The OS implies an Operating System.

Reference numeral 26 denotes a main section of the host computer 11, which is also called an information control apparatus.

The information control apparatus 26 includes a keyboard controller (KBC) 27 for controlling key input data entered from the keyboard 23 and input data instructed from a pointing device (not shown).

Further, the information control apparatus 26 includes a CRT controller (CRTC) 28 for controlling the CRT 24 and a disk controller (DKC) 29 for controlling access with respect to the external storage 25.

The information control apparatus 26 includes a printer controller (PRTC) 30 for executing a control process of communication with the image input/output apparatus 3. In addition, the information control apparatus 26 includes a RAM 31 having the function as a work area, etc., and a ROM 32 storing a predetermined print control program, etc.

The above-described components are connected to a CPU 34 via a system bus 33, and the CPU 34 executes control of the entire information control apparatus 26.

The external storage 25 may be not only a hard disk that is built in the apparatus or attached thereto, but also a storage medium, such as a FD, a CD, a CD-R, a CD-R/W, an MO (magneto-optical) disk, a DVD, or an optical disk. In the latter case, the DKC 29 corresponds to a drive for reading data from the storage medium.

The function of the image input/output apparatus 3 for sending the current device information to the host computer 11 will be described below.

The device information of the image input/output apparatus 3 includes items representing paper feed stages mounted in the reader unit 1 and the printer unit 2, the paper discharging apparatus (finisher), etc. Further, the device information includes information representing respective sheet types of paper set in the paper feed stages. In addition, the device information includes information representing box files, form files, and clear form files which are stored in the storage unit 5.

The device information is sent from the reader unit 1 and the printer unit 2 to the CPU 123 through the I/F 122 and is stored in the memory 124. The information representing the box files, the form files, and the clear form files, which are stored in the storage unit 5, is also sent to the CPU 123 through the I/F 120 and is stored in the memory 124. Alternatively, the device information may also be recorded, through the I/F 120, in a storage area dedicated for the device information in the hard disk 6 that is managed by the storage unit 5.

When acquisition of the device information is notified from the host computer 11 on the network through the computer interface unit 7, the CPU 123 acquires the device information stored in the memory 124. Alternatively, the CPU 123 acquires, through the I/F 120, the device information recorded in the storage unit 5. Then, the CPU 123 sends the acquired device information to the computer interface unit 7 through the I/F 120. Such a process of inquiring individual devices (units) of current information from the host computer 11 and acquiring the information is called "dynamic configuration".

When the configuration of the device information is changed, an event indicating the change of the device information can be sent to the host computer 11 even when the acquisition of the device information is not notified from the host computer 11 on the network through the computer interface unit 7. The change of the device information includes, for example, an error in the image input/output apparatus, the end of a job, and deletion of the box file, the form file, or the clear form file stored in the storage unit 5. Such a process in which the core unit 10 takes an action to send information and the image input/output apparatus 3 sends an event indicating a change of the device information by itself to the host computer 11, thus causing the printer driver in the host computer 11 to obtain the sent information, is called "auto-configuration" using WSD.

The following description is given of steps until a print processing apparatus constituted in the host computer 11, illustrated in FIG. 5, starts operation.

Figure 6:
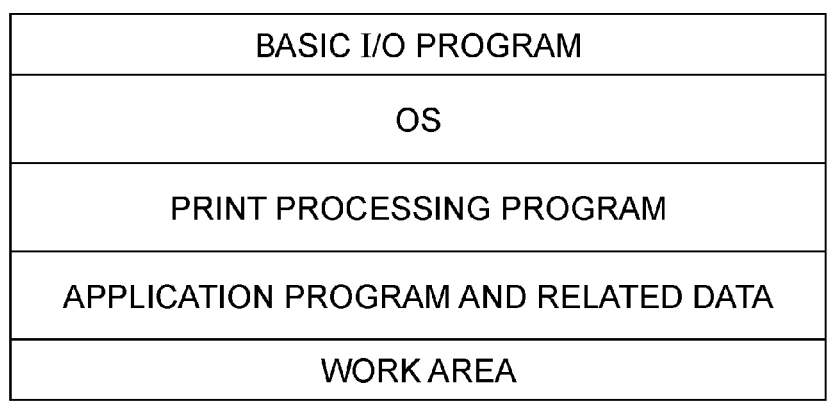
FIG. 6 illustrates a memory map of a computer-readable recording medium that records programs for causing a computer to function as the host computer in the first exemplary embodiment.

FIG. 6 illustrates a memory map of a computer-readable recording medium that records programs for causing a computer to function as the host computer 11 in the first exemplary embodiment.

The host computer 11 is operated by the CPU 34 executing a basic I/O program, an operating system (OS), and a print processing program, illustrated in FIG. 6. The basic I/O program is written in the ROM 32 inside the host computer 11, and the operating system (OS) is written in a hard disk (HD) inside the host computer 11 or the external storage 25, such as a flexible disk (FD).

First, upon power-on of the host computer 11, an initial program loading (IPL) function in the basic I/O program operates. With that function, the operating system (OS) stored in the hard disk (HD) inside the host computer 11 or the external storage 25, such as a flexible disk (FD), is read into the RAM 31 inside the host computer 11 and the OS is operated by the CPU 34.

Next, the operator selects, e.g., a command image in a command menu, which is displayed on a screen of the display unit 24 of the host computer 11, by manipulating the keyboard 23 or the pointing device of the host computer 11. When the operator instructs execution of an application in such a manner, the CPU 34 reads the application, which is stored in the hard disk (HD) or the external storage 25, such as a flexible disk (FD), into the RAM 31, whereby the application starts to operate.

Next, the operator instructs printing through similar procedures to those performed when the application is started up as described above. In response to the instruction, the print processing program and a printer control command generating program (printer driver), which have, e.g., the function of superimposing the print data and which are stored in the hard disk (HD) or the external storage 25, such as a flexible disk (FD), are read into the RAM 31 and are executed by the CPU 34. The print processing system starts operation in such a way.

In this exemplary embodiment, the print processing program and related data are stored in the storage medium, such as a flexible disk (FD), and the configuration of contents recorded in the storage medium are illustrated in FIG. 6.

The print processing program and the related data stored in the flexible disk (FD), which set in the host computer 11, can also be loaded into the host computer 11 through a disk controller unit inside the host computer 11. Stated another way, when the flexible disk (FD) is set in the disk controller unit, the print processing program and the related data are read from the flexible disk (FD) under control of the OS and the basic I/O program. The print processing program and the related data are then loaded into the RAM 31 inside the host computer 11 and brought into a state ready for the operation.

Figure 7:
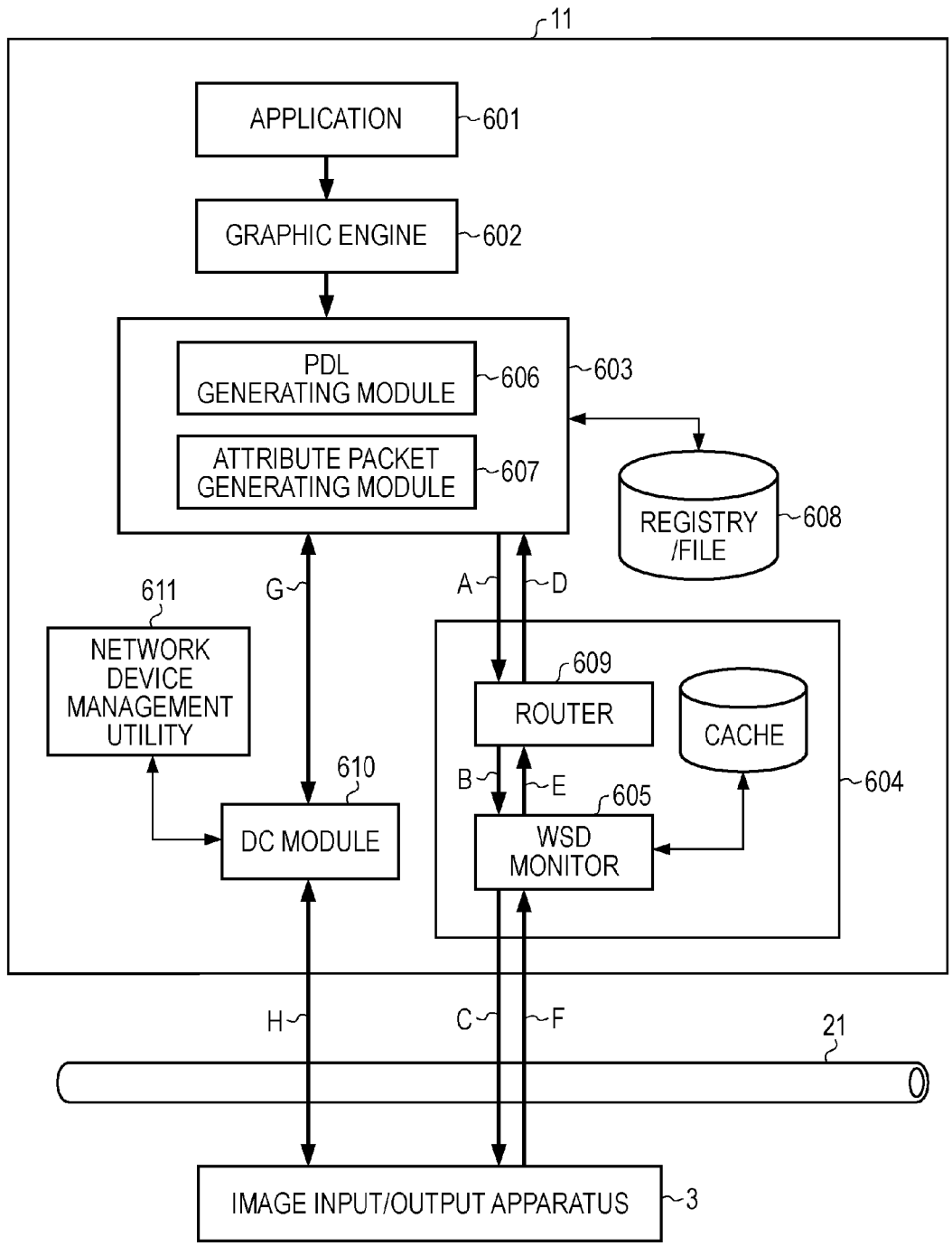
FIG. 7 is a block diagram illustrating a module configuration of the host computer illustrated in FIG. 5.

FIG. 7 is a block diagram illustrating a module configuration of the host computer 11 illustrated in FIG. 5.

Referring to FIG. 7, the host computer 11 includes an application 601, a graphic engine 602, a printer driver 603, and a system spooler 604.

The host computer 11 further includes a WSD monitor 605, a PDL generating module 606, an attribute packet generating module 607, and a router 609.

Those components are, for example, program modules which are present as files stored in the external storage 25 set in the host computer 11, and which are loaded into the RAM 31 by the OS or another module utilizing the relevant module and are executed by the CPU 34.

The application 601 and the printer driver 603 can be supplied from a storage medium (not shown), such as an FD or a CD-ROM, or can be supplied to the hard disk inside the host computer 11 via the network. When the application 601 performs printing with the image input/output apparatus 3, outputting (drawing) for the printing is executed by using the graphic engine 602.

The application 601 generates a desired document in accordance with operations by the user, and it can output the document, as a drawing function, to the graphic engine 602, i.e., a drawing unit provided by the OS, in response to a print instruction from the user. In the case of Windows (registered trademark by Microsoft Corporation) OS, the graphic engine 602 serving as the drawing unit is called a GDI (Graphic Device Interface). The application 601 converts a document, which is to be printed, to the drawing function defined by the GDI in the OS, and then outputs the drawing function, i.e., the GDI function, to the GDI (graphic engine) 602.

Upon receiving a print start instruction from the application 601, the graphic engine 602 loads the printer driver 603, which is prepared for each printing apparatus, into the RAM 31 and sets outputting of the application 601 in the printer driver 603. Further, the graphic engine 602 converts a GDI function received from the application 601 to a DDI (Device Driver Interface) function and outputs the DDI function to the printer driver 603.

The PDL generating module 606 of the printer driver 603 converts the DDI function received from the graphic engine 602 to printer-recognizable control commands, e.g., PDL (Page Description Language). Further, the attribute packet adding module 607 of the printer driver 603 brings the converted printer control commands into packets, generates print data added with attribute information, and sends the generated print data to the system spooler 604 which has been loaded by the OS (route A).

The system spooler 604 outputs the print data to the computer interface unit 7 of the image input/output apparatus 3 (route C) via the router 609 and the WSD monitor 605 (described later) (route B).

The above-mentioned auto-configuration function will be described below.

With the auto-configuration function, the device information, including the end of a job and deletion of various image data, is received from the image input/output apparatus 3 by utilizing the WSD monitor 605 and the router 609, which are present on the system spooler 604.

As components to implement the auto-configuration function using WSD, the system spooler 604 includes the WSD monitor 605 and the router 609.

The WSD monitor 605 is connected to the image input/output apparatus 3 through the WSD port, which is defined on the operating system of Windows (registered trademark), for communication with the image input/output apparatus 3 (routes C and F). Further, the router 609 is connected to the printer driver 603 through the WSD port for communication therewith (routes B and E).

When the device environmental situation is changed in the image input/output apparatus 3, the image input/output apparatus 3 notifies the change to the WSD monitor 605 by using WS-Event that is defined on the operating system of Windows (registered trademark) (route F).

For example, whenever the configuration of the paper feed section, the paper discharge section (finisher option), etc. in the image input/output apparatus 3 is changed, the image input/output apparatus 3 can send the WS-Event. Alternatively, the image input/output apparatus 3 may send the WS-Event at the timing of power-on or -off after the change of the configuration.

Thus, when the timing information is set in the image input/output apparatus 3, the timing of notifying the WS-Event can be controlled by the image input/output apparatus 3 such that the WS-Event is notified at the preset timing.

The WS-Event is defined based on protocols which are called a SOAP message and are described in the format of XML, for example. The WS-Event notifies only the event of a status change in the image input/output apparatus 3.

Regarding the status change, it is also possible to notify what information is updated or changed, such as deletion of the box file, the form file, and the clear form file which are stored in the image input/output apparatus 3.

Further, the WSD monitor 605 having received the WS-Event sends, with respect to the item notified by the WS-Event, an SOAP message, which is called GetPrinterEvent, to the image input/output apparatus 3 through the WSD port (route C).

The GetPrinterEvent is also defined in the format of XML, for example. With that message, the WSD monitor 605 acquires the device information in the latest state from the image input/output apparatus 3 (route F). The device information can be acquired with respect to only the item for which the notification has been sent with the WS-Event.

The WSD monitor 605 having acquired the device information determines whether there is a difference between the acquired device information and device information data cached on the system spooler 604. Only if there is a difference between the acquired device information and device information data cached on the system spooler 604, the acquired device information is notified to the printer driver 603 through the router 609 and the WSD port on the system spooler 604 (route D).

Further, the WSD monitor 605 caches, as the latest data, the device information data on the system spooler 604 for use in determination as to the presence of the above-mentioned difference when the device information is acquired next time. As a result, the difference between the latest device information and the cache data on the system spooler 604 can be determined.

If there is no difference between the acquired latest device information and the cache data acquired last time, this can be determined as indicating no change in the configuration, and hence no notification is sent to the printer driver 603. Through the above-described procedures, the information in the printer driver 603 is in no way affected even when the device information remaining unchanged is not notified to the printer driver 603.

Herein, the router 609 on the system spooler 604 notifies, to the printer driver 603, the changed device information in the form of an argument of DrvPrinterEvent for the printer driver 603. The argument is also expressed in the format of XML, and individual items of the device information can be each notified by using the argument.

The printer driver 603 can record the acquired device information in a registry/file 608. The printer driver 603 can read the information recorded in the registry/file 608, as required, and can display the read information on a printer driver UI.

The function of the printer driver 603 can also be implemented by the printer driver having the above-described configuration to function as a printer driver on a printer server. In such a case, the information recorded in the registry/file 608 can be notified (though not illustrated) to the printer driver on the client side, which is connected in point-and-print fashion.

The above-mentioned dynamic configuration function will be described below.

The printer driver 603 separately includes, as in the past, a unit for directly communicating with the image input/output apparatus 3 (routes G and H). Those routes are provided by utilizing the ordinary TCP/IP port and can be used to send the current information of the printer driver 603 to the image input/output apparatus 3 or to inquire the current information of the image input/output apparatus 3 by using, e.g., MIB (Management Information Base).

A network device management utility 611 is utility software for managing devices connected to a LAN (Local Area Network) 21. The network device management utility 611 collects the device information from each device on the network 21 through a DC module 610 (module for the dynamic configuration, which is also called a device information acquiring module) 610. The network device management utility 611 can display the status, the device information, etc. of each device on the display unit such that the user can recognize them. An example of the device information is a list including the box files, the form files, and the clear (toner) form files which are stored in the image input/output apparatus 3.

Further, the network device management utility 611 can receive an instruction from the user and can issue various control commands to the device on the network 21. The control commands issued by the network device management utility 611 include, e.g., job control commands indicating depletion of the print job held in the network device, a temporary stop thereof, and a change of the printing sequence. Other examples of the control commands issued by the network device management utility 611 include device control commands for changing the IP address and various settings of the network device.

Upon receiving, from the network device management utility 611, an instruction for acquiring the device information, the DC module 610 sends an inquiry to the computer interface unit 7 of the image input/output apparatus 3 via, e.g., the network (route H). Also, when the device information is sent from the computer interface unit 7 to the DC module 610 serving as the device information acquiring module via, e.g., the network (route H), the DC module 610 replies the device information to the network device management utility 611.

The DC module 610 is a module utilized by the network device management utility 611 and is installed at the same time as the network device management utility 611.

Further, those routes (G and H) enable communication with the image input/output apparatus 3 by utilizing WEB service. The communication utilizing WEB service can also be performed through a WEB service module (though not shown).

<Trial Printing (Test Print) Function>

The operation of this exemplary embodiment will be described below with reference to FIGS. 8 to 14.

The first exemplary embodiment provides the "trial printing function" when the clear toner printing is performed by using the printer driver 603. The term "trial printing function in the clear toner printing" implies a test print in which printing is performed without using the clear toner (using YMCK toners instead) to confirm the state (position) and the effect (glossy- or matt expression) of a glossy region (i.e., a region (portion) printed using the clear toner).

When the clear toner printing is performed with the trial printing function, the printer driver 603 analyzes colors designated for objects in document data (i.e., color-toner data printed by using plural kinds of color toners), namely colors designated in the document data. The printer driver 603 automatically defines, based on the analyzed result, two different colors (first and second colors) which are not used in the objects (i.e., which are discernible relative to the colors designated in the document data). Then, the printer driver 603 sets (designates) the first one of the defined two colors as a color used to print a region (portion) designated in the form file (i.e., clear-toner data printed by using the clear toner) where the clear toner is coated. Also, the printer driver 603 sets (designates) the second color as a color used to print a region (portion) designated in the form file where the clear toner is not coated. Further, the printer driver 603 adds the relevant information to the document data and outputs them in an overlaid (superimposed) manner.

Figure 8:
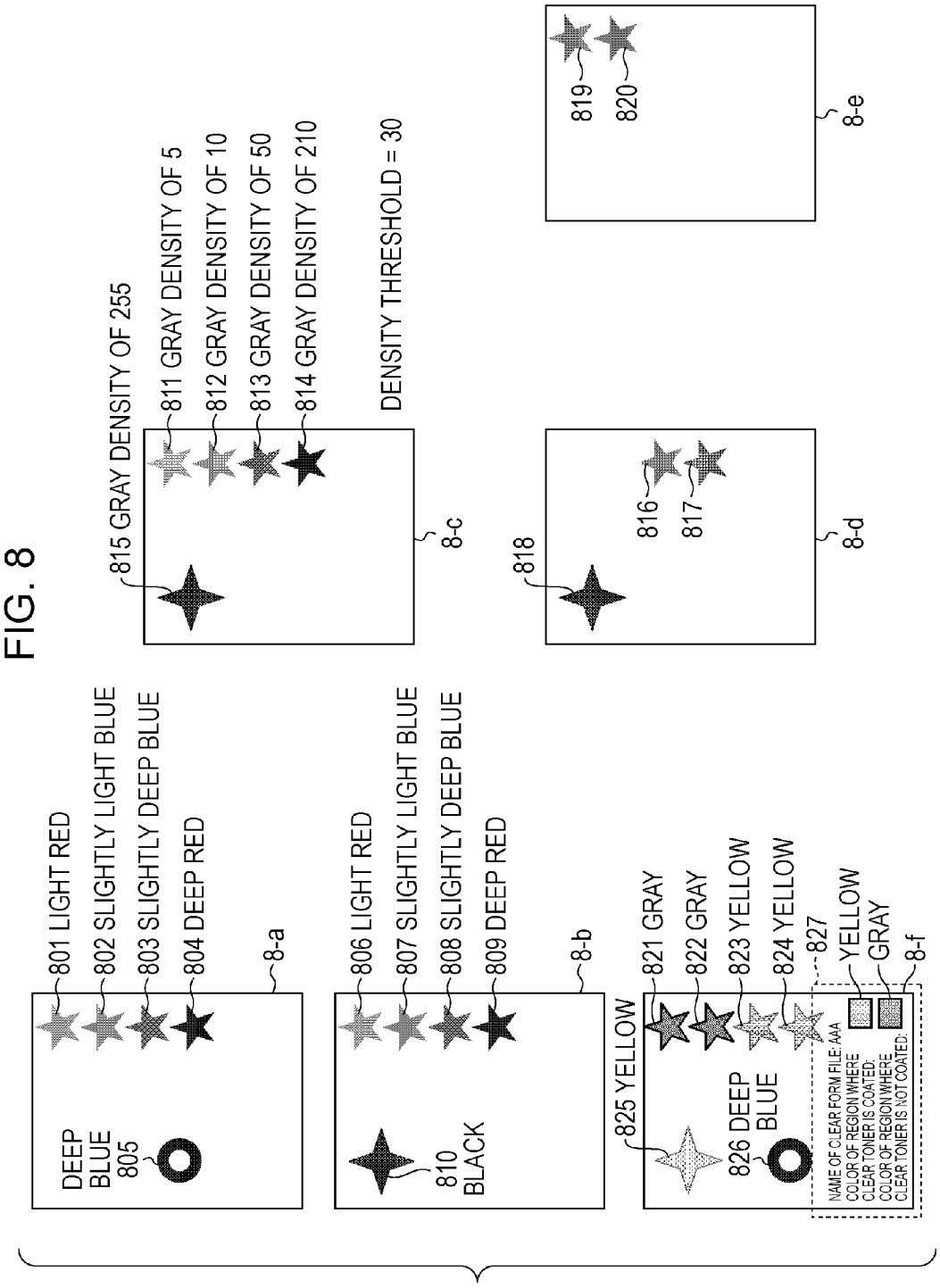
FIG. 8 visually represents image examples of actual data and output results in trial print of clear toner printing in the first exemplary embodiment of the present invention.

FIG. 8 visually represents image examples of actual data and output results in the trial print of the clear toner printing in the first exemplary embodiment of the present invention. Respective colors corresponding to objects are additionally denoted in FIG. 8 for easier understanding.

In FIG. 8, an illustration 8-a visually represents an example of document data prepared by the operator. Herein, the document data prepared by the operator is color data as illustrated, and includes a plurality of objects as denoted by 801 to 805. In the illustrated example, the object 801 is light red, and the object 802 is slightly light blue. The object 803 is slightly deep blue, the object 804 is deep red, and the object 805 is deep blue.

An illustration 8-b visually represents an example of the clear form file prepared by the operator to perform the clear toner printing over the document data illustrated in 8-a.

Here, because the operator prepares the clear form file such that the clear toner is coated on several of the objects in the document data 8-a, part of the document data is employed as clear form data without changes.

For example, the clear form data for objects denoted by 806, 807, 808 and 809 are prepared by employing respectively the objects 801, 802, 803 and 804 in the document data 8-a, as they are.

Accordingly, respective colors of the objects 806 to 809 are likewise set such that 806 is light red, 807 is slightly light blue, 808 is slightly deep blue, and 809 is deep red.

Further, in the illustrated example, the object 805 in the document data 8-a is deleted on the clear form file 8-b so as not to intentionally coat the clear toner on the object 805. Instead of the object 805, a new object 810 is added in black.

The clear toner printing intended by the operator in the illustrated example is to coat the clear toner on regions of the document data 8-a, which correspond respectively to the objects indicated in 8-b. The clear form file may be previously stored in the storage unit 5 of the image input/output apparatus 3, described above with reference to FIG. 3, together with the name of the clear form file by the operator performing the predetermined operation.

Illustrations 8-c, 8-d and 8-e in FIG. 8 visually represent processing executed in the core unit 10 of the image input/output apparatus 3 described above with reference to FIG. 3. The processing will be described in detail below.

The illustration 8-c visually represents a state after the clear form file has been binarized in the image input/output apparatus 3 into a monochrome gray space with shades of 0 to 255 for the purpose of the clear toner printing.

In the example of 8-c, objects corresponding to 806 to 810 in 8-b are denoted respectively by 811 to 815 and are converted to data expressed with a gray density of 5, 10, 50, 210 and 255 successively from the top object 811.

An illustration 8-d represents an example of a state after the objects of the clear form file binarized into the monochrome gray space, illustrated in 8-c, have been masked based on the density threshold preset in the image input/output apparatus 3. The density threshold can take any value in the same range as that of the monochrome gray space with shades of 0 to 255, and it is set to "30" in the illustrated example.

As a result, the objects 813, 814 and 815 having values higher than the density threshold "30" are extracted from 8-*c* as objects on which the clear toner is to be coated, and they are denoted respectively by objects 816, 817 and 818 in 8-*d*.

An illustration 8-*e* visually represents an example of the objects which have been masked without being extracted from the clear form file 8-*c*. When the density threshold is set to 30 as described above, the objects 811 and 812 in 8-*c* are masked and represented respectively by 819 and 820 in 8-*e*.

Thus, regions in the document data 8-*a* where the clear toner is coated are provided by the objects 808, 809 and 810 of the clear form file illustrated in 8-*b*. In other words, internal processing is executed such that the clear toner is coated on the extracted regions illustrated in 8-*d* and the clear toner print is output in a superimposition (overlay) relation to the document data 8-*a*.

An illustration 8-*f* represents an example of the output result of the "trial printing" in this exemplary embodiment. Herein, 8-*f* represents the output result of carrying out the clear toner trial printing in the clear form 8-*b* with respect to the document data 8-*a*.

In the illustrated example 8-*f*, objects 823, 824 and 825 are expressed yellow as regions where the clear toner is coated. Also, 821 and 822 are expressed gray as regions where the clear toner is not coated.

Reference numeral 826 denotes an object which is expressed in the same color as that of the object 805 in 8-*a*. Stated another way, the illustration 8-*f* indicates the state that the objects illustrated in 8-*d* are set to yellow as the regions where the clear toner is coated, and they are output while being overlaid (superimposed) with the document data 8-*a*, and that the objects illustrated in 8-*e* are set to gray as the regions where the clear toner is not coated, and they are output while being overlaid (superimposed) with the document data 8-*a*.

Reference numeral 827 in 8-*f* denotes incidental information of the trial printing. In the illustrated example, the name of the clear form file ("AAA" in FIG. 8) is output. Other items output together include an output color ("yellow" in FIG. 8) of the region where the clear toner is coated, and an output color ("gray" in FIG. 8) of the region where the clear toner is not coated.

Figure 9:
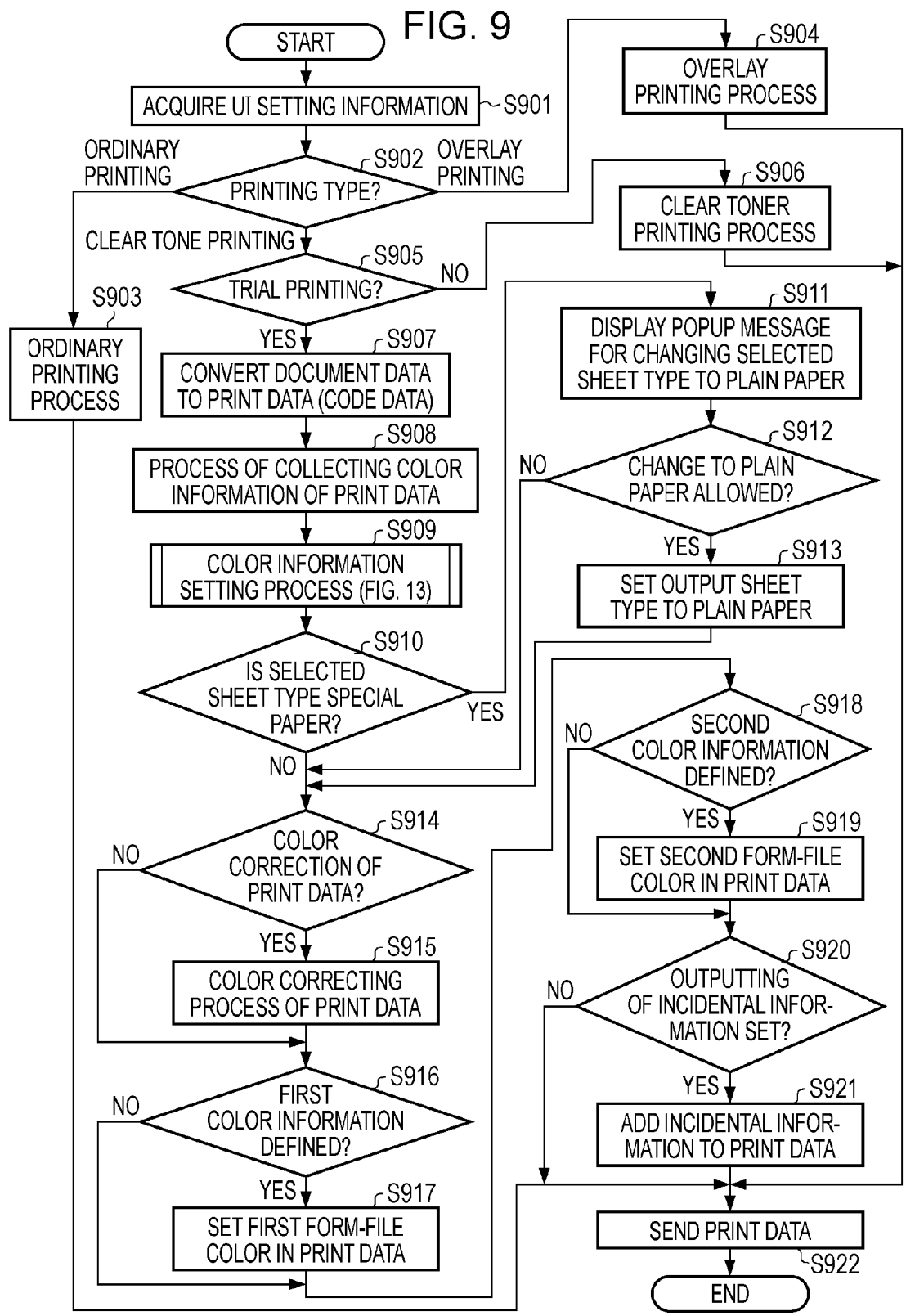
FIG. 9 is a flowchart illustrating a processing flow executed in a printer driver in the first exemplary embodiment.

FIG. 9 is a flowchart illustrating a processing flow executed in the printer driver 603 in the first exemplary embodiment. When the user carries out printing from an application, the printer drive program stored in, e.g., the external storage 25, illustrated in FIG. 5, is loaded into the RAM 31 and the processing of the illustrated flowchart is executed by the CPU 34.

First, in S901, the printer driver 603 acquires various items of setting information in a user interface (UI) for the printer driver 603 from the RAM 31 or the external storage 25. One example of the printer driver UI is illustrated in FIG. 10 described later.

Then, in S902, the printer driver 603 determines the printing type designated in the setting information that has been acquired in S901. The printing type includes an ordinary printing process, an overlay printing process, and a clear toner printing process.

If it is determined in S902 that the printing type is "ordinary printing", the printer driver 603 advances the processing to S903 in which the ordinary printing process is executed. A detailed description of the ordinary printing process step (S903) is omitted. After the ordinary printing process, the printer driver 603 advances the processing to S922.

If it is determined in S902 that the printing type is "overlay printing", the printer driver 603 advances the processing to S904 in which the overlay printing process is executed. A detailed description of the overlay printing process step is omitted. After the overlay printing process, the printer driver 603 advances the processing to S922.

If it is determined in S902 that the printing type is "clear toner printing", the printer driver 603 advances the processing to S905.

In S905, the printer driver 603 determines whether the clear toner printing mode is "trial printing" (i.e., determines the setting in a trial printing check box 1005 in FIG. 10 described later).

If it is determined in S905 that the clear toner printing mode is not "trial printing", the printer driver 603 advances the processing to S906 in which the clear toner printing process is executed. The clear toner printing process executed here will be described in brief below.

The clear toner printing process is basically similar to the overlay printing process. Document data is converted to print data (code data (PDL)) as in the ordinary printing process, and the name of the clear form file, which has been acquired in S901, is set to the print data to designate the clear form file that is superimposed in the clear toner printing. Further, a clear toner printing command is added to the print data. The foregoing is the clear toner printing process executed in S906. After the end of the clear toner printing process in S906, the printer driver 603 advances the processing to S922.

On the other hand, if it is determined in S905 that the clear toner printing mode is "trial printing", the printer driver 603 advances the processing to S907.

In S907, the printer driver 603 converts, as in the ordinary printing process, the document data to the print data (also called the code data (PDL)). Information denoted by 1201 to 1202 in FIG. 12, described later, is included in the generated print job and is stored in the RAM 31. Because the print job is here the trial printing of the clear toner printing, the information set in the print job includes, for example, "<start of clear toner printing> . . . <name of clear form file>: AAA . . . <trial printing>: ON . . . <end of clear toner printing>", which are denoted by 1203 and 1205 to 1207 in FIG. 12.

Then, in S908, the printer driver 603 executes a process of collecting color information of the print data that has been converted in S907. More specifically, the printer driver 603 executes, for example, a process of collecting color information used in the print data and forming a list (such as denoted by, e.g., 14-*a* in FIG. 14 described later).

In S909, the printer driver 603 executes a color information setting process. The term "color information setting process" implies a process of setting the color of the region where the clear toner is coated and the color of the region where the clear toner is not coated, as described above with reference to FIG. 8, with respect to each object designated in the clear form file. Herein, the color of the region where the clear toner is coated is called first color information, and the color of the region where the clear toner is not coated is called second color information. Details of the color information setting process in S909 will be described in detail later with reference to FIG. 13.

In step S910, the printer driver 603 determines the selected sheet type among the UI setting information that has been acquired in S901. If it is determined in S910 that the selected sheet type is "special paper", e.g., glossy paper, thick paper, or high-quality paper, the printer driver 603 advances the processing to S911.

In S911, the printer driver 603 displays, on the display unit 24, a popup message (FIG. 11) prompting the operator whether to change the selected sheet type to "plain paper" or not, and then waits for an input applied from the operator. Upon the input being applied from the operator, the printer driver 603 advances the processing to S912.

In S912, the printer driver 603 determines change information input in reply to the popup message displayed in S911. If it is determined that the input change information allows change to the plain paper (i.e., if the change to the plain paper is allowed (OK) or if a "Yes" button 1101 in FIG. 11 is pressed), the printer driver 603 advances the processing to S913.

In S913, the printer driver 603 sets the print data such that the setting of the output sheet type is changed to the plain paper when the selected sheet type is "special paper", and then advances the processing to S914. Correspondingly, "<change of sheet type to plain paper>: ON" denoted by 1212 in FIG. 12, described later, is set.

On the other hand, if it is determined in S912 that the change information input in reply to the message display in S911 does not allow change to the plain paper (i.e., if the change to the plain paper is not allowed (NO) or if a "No" button 1102 in FIG. 11 is pressed), the printer driver 603 advances the processing to S914 directly without changing the sheet type in the print data.

Also, if it is determined in S910 that the selected sheet type is not "special paper", the printer driver 603 advances the processing to S914 directly without changing the sheet type in the print data.

In S914, the printer driver 603 determines, based on the result of the color information setting process in S909, whether color correction of the print data is required. In this determination step, the necessity of color correction of the print data is determined if a color information correcting process flag is set ON in the color setting process of S909 (S1316 in FIG. 13 described later). If it is determined that the color correction of the print data is required, the printer driver 603 advances the processing to S915 to execute a process of correcting the color information in the print data.

The color information correcting process is now described in a supplemental manner.

In this exemplary embodiment, as described above, the printer driver 603 analyzes, in S909, the colors designated for the objects in the print data and automatically defines two colors (firs color information and second color information) which are not used in the objects. When the colors unused in the objects are not found in S909, the colors of the print data are corrected to provide two colors which differ from the colors of the print data after the correction and which are defined as two unused colors.

The color correcting process for the print data in S915 is to execute the above-described color correction of the print data. The color correction is executed in a manner of modifying the color information described (designated) in the print data. The color correction can be performed in a manner of replacing only colors close to the two colors which have been automatically defined. Further, a predetermined color correction process, such as adjusting color tone of the entire print data, may be executed. As an alternative, the color correcting step (S915) may be omitted as required, or the print data may be always corrected to optimum color information regardless of the above-described condition that two unused colors are not found.

After the end of the color correcting process for the print data in S915, the printer driver 603 advances the processing to S916.

On the other hand, if it is determined in S914 that the color correction of the print data is not required, the printer driver 603 advances the processing to S916 directly without executing the color correcting process for the print data.

In S916, the printer driver 603 determines whether the first color information has been defined in the color information setting process of S909 (i.e., whether a first clear-form color setting flag is set ON). If it is determined that the first color information has been defined, the printer driver 603 advances the processing to S917. After setting the first color information in the print data so as to become the first color information for the clear form file in S917, the printer driver 603 advances the processing to S918. As a result, information designating the color (first color) used to print the portion where the clear toner is coated is set, as denoted by 1210 in FIG. 12 described later.

On the other hand, if it is determined in S916 that the first color information has not been defined, the printer driver 603 advances the processing to S918 directly.

In S918, the printer driver 603 determines whether the second color information has been defined in the color information setting process of S909 (i.e., whether a second clear-form color setting flag is set ON). If it is determined that the second color information has been defined, the printer driver 603 advances the processing to S919. After setting the second color information in the print data so as to become the second color information for the clear form file in S919, the printer driver 603 advances the processing to S920. As a result, information designating the color (second color) used to print the portion where the clear toner is not coated, as denoted by 1211 in FIG. 12 described later.

On the other hand, if it is determined in S918 that the second color information has not been defined, the printer driver 603 advances the processing to S920 directly.

In S920, the printer driver 603 determines the presence of setting as to whether incidental information among the UI setting information acquired in S901 is to be output (i.e., the presence of setting made in an incidental information output checkbox 1007 illustrated in FIG. 10 described later). The incidental information includes, for example, the name of the selected clear form file, the output color (first color information) for the region where the clear toner is coated, and the output color (second color information) for the region where the clear toner is not coated.

If it is determined in S920 that the outputting of the incidental information is set, the printer driver 603 adds the incidental information (denoted by 1209 in FIG. 12 described later) to the printing information in S921 and then advances the processing to S922. As a result, information instructing the printing of the incidental information is set as denoted by 1209 in FIG. 12 described later. The outputting of the incidental information is represented, for example, by 827 in 8-*f* of FIG. 8. Information regarding the printed position of the incidental information is not specified here. The incidental information may be output in accordance with the preset position information, or the output position of the incidental information may be set by collecting the position information of the print data and by specifying a region where no objects are printed.

On the other hand, if it is determined in S920 that the outputting of the incidental information is not set, the printer driver 603 advances the processing to S922 directly.

In S922, the printer driver 603 sends, to the image input/output apparatus 3, the information having been set in the above-described steps and the print data (print job illustrated in FIG. 12) including the other setting information (not shown). The process of sending the print data is executed as described above with reference to FIG. 7, and hence a detailed description thereof is not repeated here.

FIG. 10 illustrates an example of a user interface enabling various settings for page option to be performed in the printer driver 603. The user interface is displayed on the display unit 24 of the host computer 11.

In FIG. 10, reference numeral 1001 denotes an entire page option dialog enabling the user to perform various settings. The page option dialog can also be opened from a user interface (not shown) in a first layer of the printer driver 603.

In the example of FIG. 10, a "clear toner" sheet is selected as the page option dialog 1001, and various setting control buttons and boxes regarding the clear toner printing are displayed.

Reference numeral 1002 denotes a radio button indicating that the clear toner printing is not performed. When the radio button 1002 is selected, the printing using the clear toner can be set not to be performed.

Reference numeral 1003 denotes a radio button for selecting whether full clear toner printing is performed as one option of the clear toner printing. When the radio button 1003 is selected, the clear toner printing can be performed over an entire region of the document data.

Reference numeral 1004 denotes a radio button for selecting whether partial clear toner printing is performed as another option of the clear toner printing. When the radio button 1004 is selected, the clear toner printing can be performed on a partial region of the document data.

The partial clear toner printing to partially coat the clear toner can be performed, as described above, by selecting the clear form file registered in advance, and by outputting the clear form file in an overlaying manner.

Those radio buttons 1002, 1003 and 1004 are exclusively pressed such that one of them is always selected. Further, when the partial clear toner printing 1004 is selected, items 1005, 1006, 1007 and 1008 in FIG. 10 are brought into a selectable state.

Reference numeral 1005 denotes a check box for selecting whether the "trial printing" according to this embodiment is performed. When the check box 1005 is selected, the "clear toner trial printing" can be performed. Reference numeral 1006 denotes a control box for selecting one of trial printing options. The control box 1006 enables the user to select an option of performing printing on both the region where the clear toner is coated and the region where the clear toner is not coated. In the state of FIG. 10, the background of the item "printing on both regions" is turned to gray and the option of printing both the region where the clear toner is coated and the region where the clear toner is not coated is selected.

In addition, though not described in detail in this exemplary embodiment, there are other options of performing the trial printing on the region where the clear toner is coated, and of performing the trial printing on the region where the clear toner is not coated. When one of those options is selected, the trial printing can be performed by changing a color of only the region where the clear toner is coated, or a color of only the region where the clear toner is not coated.

Reference numeral 1007 denotes an example of a check box for selecting whether the incidental information is output. When the check box 1007 is selected, the name of the clear form file and the color information can be output in addition to the print data in S921 of FIG. 9.

Reference numeral 1008 denotes a control box for displaying a list of clear form files stored in the image input/output apparatus 3 and for selecting one of the listed files. The list of clear form files stored in the image input/output apparatus 3 can be prepared, as described above, by the printer driver 603 acquiring the relevant information through the DC module 610 with the dynamic configuration function, for example. In the illustrated example, four clear form files are displayed along with respective saved dates and times. Further, the clear form file having the name "AAA" is selected from among the four clear form files.

Reference numeral 1009 denotes a tab for selecting a sheet for which detailed setting of the overlay printing is performed. When the tab 1009 for the overlay printing is selected, the ordinary overlay printing can be performed instead of the clear toner printing.

The UI setting information set on the UI 1001 is stored in the RAM 31 of the host computer 11 or the external storage 25.

FIG. 11 illustrates an example of the popup message displayed in S911 of FIG. 9.

As illustrated in FIG. 11, the popup message displays a "Yes" button 1101 and a "No" button 1102 to be able to accept an input from the operator.

FIG. 12 illustrates an example of details of the print data (job) sent from the printer driver 603 in S922 of FIG. 9.

As illustrated in FIG. 12, the drawing information of the document data is represented by document drawing data that starts with <start of document> 1201 and ends at <end of document> 1202.

When the color correcting process for the print data is executed in S915 of FIG. 9, the process is executed on the document drawing data that starts with <start of document> 1201 and ends at <end of document> 1202.

Also, the print data includes various items of clear toner printing information. The clear toner printing information starts with <start of clear toner printing> 1203 and ends at <end of clear toner printing> 1204. In more detail, 1203 and 1204 represent information that indicates the clear toner printing. As the clear toner printing information, <clear toner mode> 1205 sets the type (<not perform>, <full clear toner printing>, or <partial clear toner printing>) of the clear toner processing method which has been set in FIG. 10 as described above. In the illustrated example, the "partial clear toner printing" is set.

Further, <name of clear form file> 1206 sets the name of the clear form file, which has been selected in the control box 1008 of FIG. 10. In other words, 1206 represents information designating the form data (clear form file) to be used from among a group of form data registered in the image input/output apparatus 3. In the illustrated example, "AAA" is set as the name of the clear form file to be used.

<Trial printing> 1207 sets ON/OFF of the <trial printing> that has been set in the check box 1005 of FIG. 10. In the illustrated example, the trial printing is set ON. In other words, 1207 represents information instructing the trial printing (test print) with the clear toner printing.

<Trial printing mode> 1208 sets the <trial printing mode> that has been set in the control box 1006 of FIG. 10. In the illustrated example, the <printing on both regions> is set as the trial printing mode. In other words, 1208 represents information instructing one mode of the clear toner printing, i.e., the printing on the region where the clear toner is coated, the printing on the region where the clear toner is not coated, or the printing on both the regions.

<Outputting of Incidental information> 1209 sets the <outputting of incidental information> that has been set in the check box 1007. In the illustrated example, the <outputting of incidental information> is set ON. In other words, 1209 represents information instructing printing of the information indicating that the first color denotes the region where the clear toner is coated, and that the second color denotes the region where the clear toner is not coated.

<First color information> 1210 and <second color information> 1211 set designation of the color information that has been defined in S909 of FIG. 9. In other words, 1210 represents information indicating that the region where the clear toner is coated is printed in the first color. Also, 1211 represents information indicating that the region where the clear toner is not coated is printed in the second color.

<Change of sheet type to plain paper> 1212 sets information instructed by the operator in response to the popup message (FIG. 11) displayed in S911 of FIG. 9, i.e., information instructing the image input/output apparatus 3 to change the sheet type to plain paper when the selected sheet type is special paper.

When the <start of clear toner printing> 1203 and the <end of clear toner printing> 1204 are not present, the print job can be performed as the ordinary printing. Further, various items of information for the ordinary overlay printing can also be recorded by replacing the <start of clear toner printing> 1203 and the <end of clear toner printing> 1204 with <start of overlay printing> and <end of overlay printing>, respectively.

The color information setting process denoted in S909 of FIG. 9 will be described in detail below with reference to a flowchart of FIG. 13.

Figure 13:
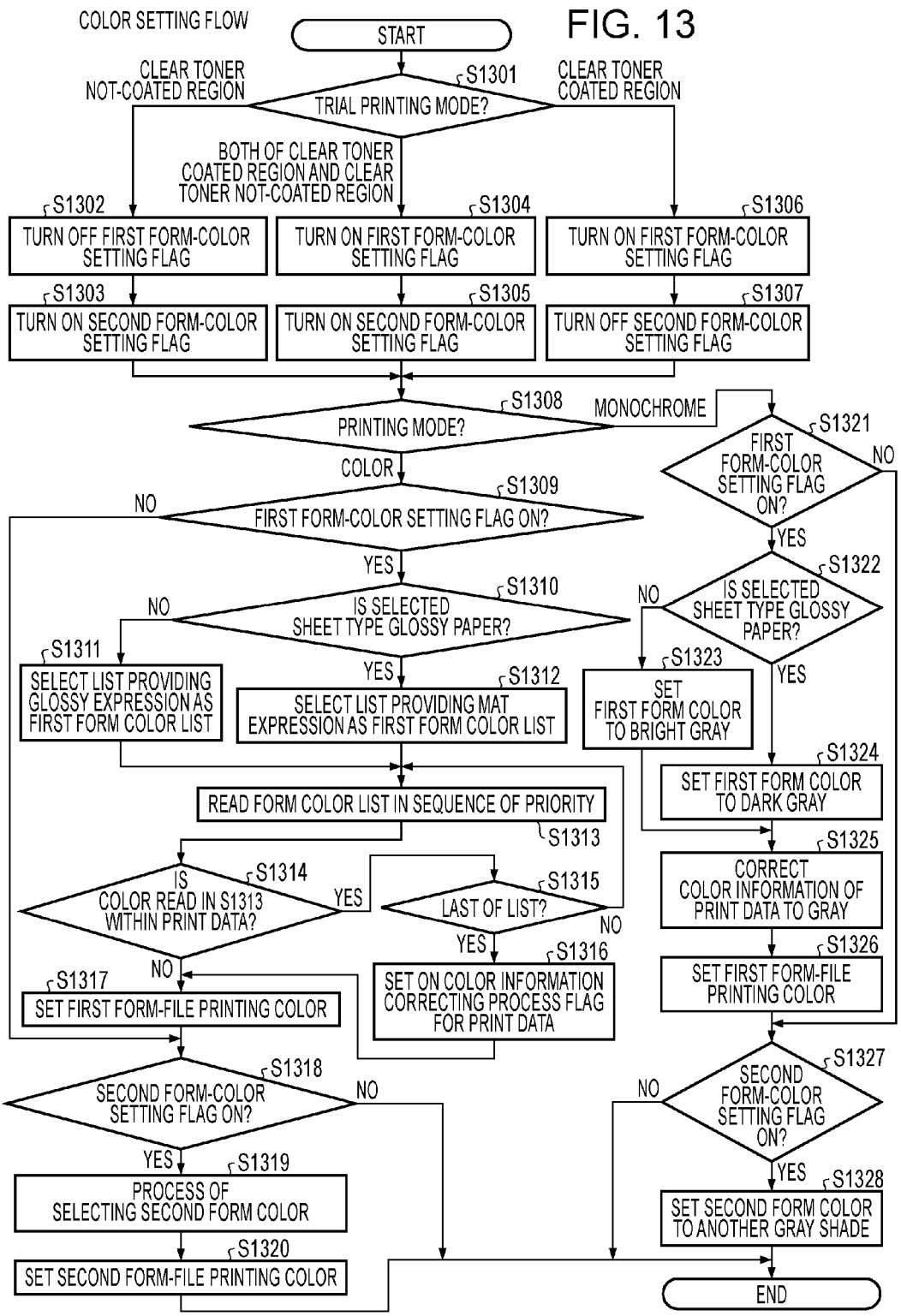
FIG. 13 is a flowchart illustrating details of a color information setting process denoted in S909 of FIG. 9.

FIG. 13 is a flowchart illustrating details of the color information setting process in S909 of FIG. 9. The color information setting process is executed by the printer driver 603.

First, in S1301, the printer driver 603 determines the trial printing mode. The term "trial printing mode" represents the trial printing option that can be selected on the driver user interface 1006 illustrated in FIG. 10. The trial printing mode is included in the information acquired in S901 of FIG. 9. If the trial printing mode is a mode of performing printing on the region where the clear toner is coated and the region where the clear toner is not coated (i.e., printing on both the regions), the printer driver 603 advances the processing to S1304.

In S1304, the printer driver 603 turns ON a first clear-form color setting flag to set a first clear form color. In S1305, the printer driver 603 turns ON a second clear-form color setting flag to set a second clear form color. Then, the printer driver 603 advances the processing to S1308.

If it is determined in S1301 that the trial printing mode is the mode of performing the printing only on the region where the clear toner is coated, the printer driver 603 advances the processing to S1306.

In S1306, the printer driver 603 turns ON the first clear-form color setting flag to set the first clear form color. In S1307, the printer driver 603 turns OFF the second clear-form color setting flag. Then, the printer driver 603 advances the processing to S1308.

If it is determined in S1301 that the trial printing mode is the mode of performing the printing only on the region where the clear toner is not coated, the printer driver 603 advances the processing to S1302.

In S1302, the printer driver 603 turns OFF the first clear-form color setting flag. In S1303, the printer driver 603 turns ON the second clear-form color setting flag to set the second clear form color. Then, the printer driver 603 advances the processing to S1308.

Next, in S1308, the printer driver 603 determines whether the printing mode is color printing or monochrome (gray) printing. In the case of printing from the printer driver 603, the operator can usually select whether the color printing or the monochrome (gray) printing is performed. That information regarding the selection is also included in the information acquired in S901 of FIG. 9.

If it is determined in S1308 that the printing mode is the color printing mode, the printer driver 603 advances the processing to S1309.

In S1309, the printer driver 603 determines whether the first clear-form color setting flag is turned ON or OFF. If the first clear-form color setting flag is turned OFF, the printer driver 603 advances the processing to S1318 directly.

On the other hand, it is determined in S1309 that the first clear-form color setting flag is turned ON, the printer driver 603 advances the processing to S1310 to set the first clear form color.

In S1310, the printer driver 603 determines the selected sheet type. The information of the sheet type is also included in the information acquired in S901 of FIG. 9. If it is determined in S1310 that the sheet type is glossy paper, the printer driver 603 advances the processing to S1312.

In S1312, the printer driver 603 selects, as the first clear form color, a color providing a matt expression (i.e., a color having low brightness) from the color list table (14-*b* in FIG. 14) that is prepared in advance. The printer driver 603 then advances the processing to S1313.

On the other hand, if it is determined in S1310 that the paper type is not glossy paper, the printer driver 603 advances the processing to S1311.

In S1311, the printer driver 603 selects, as the first clear form color, a color providing a glossy expression (i.e., a color having high brightness) from the color list table (14-*b* in FIG. 14) that is prepared in advance. The printer driver 603 then advances the processing to S1313.

The sheet type and color expression selected depending on the sheet type will be described in brief below.

It is known that the clear toner provides different expression effects from its specific property depending on the type of sheet on which the clear toner is printed. For example, when the sheet type is glossy paper, the region where the clear toner is coated provides a matt expression effect. In the above-described step S1312, therefore, a color defined in advance as providing the matt expression effect (i.e., a color having low brightness) is selected as the color of the region where the clear toner is coated. Conversely, when the sheet type is not glossy paper, the region where the clear toner is coated provides a glossy expression effect. In the above-described step S1311, therefore, a color defined in advance as providing the glossy expression effect (i.e., a color having high brightness) is selected as the color of the region where the clear toner is coated. Note that whether the sheet type is glossy paper or not can also be defined in advance based on various parameters specifying the sheet type and the sheet properties. In such a case, the relevant information can also be acquired in S901 of FIG. 9.

In S1313, the printer driver 603 reads, as the clear form color, data for each color in sequence of priority from the clear form color list which has been selected in S1311 or S1312.

In S1314, the printer driver 603 determines whether the clear form color having been read in S1313 is included in the color information of the print data, which has been collected in S908 of FIG. 9. The color determination in S1314 can be practiced by a method of determining colors having RGB values, which match with each other or which fall within a certain threshold range, to be the same color.

If it is determined in S1314 that the clear form color having been read in S1313 is not included in the color information of the print data, the printer driver 603 advances the processing to S1317 in which the selected color is set as the first clear form file color. Additionally, the color set at that time is excluded from the color list.

On the other hand, if it is determined in S1314 that the clear form color having been read in S1313 is included in the color information of the print data, which has been collected in S908 of FIG. 9, the printer driver 603 advances the processing to S1315.

In S1315, the printer driver 603 determines whether the clear form color having been read in S1313 is the last color in the selected clear form color list.

If it is determined in S1315 that the clear form color having been read in S1313 is not the last color in the selected clear form color list, the printer driver 603 returns the processing to S1313 to select the next color.

On the other hand, if it is determined in S1315 that the clear form color having been read in S1313 is the last color in the selected clear form color list, the printer driver 603 advances the processing to S1316.

In S1316, the printer driver 603 turns ON a flag to execute a color information correcting process for the print data. That flag is the flag determined in the above-described step S914 of FIG. 9. Further, the printer driver 603 selects, as a candidate for the first form file color, the color ranked top in the sequence of priority, for example, and sets the selected color as the first clear form color in S1317. Additionally, the color set at that time is excluded from the color list.

In S1318, the printer driver 603 determines whether the second clear-form color setting flag is turned ON or OFF. If the second clear-form color setting flag is turned OFF, the printer driver 603 brings the processing of the flowchart of FIG. 13 to an end directly.

On the other hand, it is determined in S1318 that the second clear-form color setting flag is turned ON, the printer driver 603 advances the processing to S1319 to set the second clear form color.

In S1319, the printer driver 603 executes a process of selecting the second clear form color from the color list. The color selecting process in S1319 is executed through substantially the same steps as those in the above-described S1313 to S1316 and hence a detailed description thereof is not repeated here.

In S1320, the printer driver 603 sets the color, which has been selected in S1319, as the color of the second clear form file. Thereafter, the printer driver 603 brings the processing of the flowchart of FIG. 13 to an end.

If it is determined in S1308 that the printing mode is the monochrome (gray) printing, the printer driver 603 advances the processing to S1321.

In S1321, the printer driver 603 determines whether the first clear-form color setting flag is turned ON or OFF. If the first clear-form color setting flag is turned OFF, the printer driver 603 advances the processing to S1327 directly.

On the other hand, it is determined in S1321 that the first clear-form color setting flag is turned ON, the printer driver 603 advances the processing to S1322 to set the first clear form color.

In S1322, the printer driver 603 determines the selected sheet type. If it is determined in S1322 that the sheet type is glossy paper, the printer driver 603 advances the processing to S1324.

In S1324, the printer driver 603 selects, as the first clear form color, rather dark gray from the color list table (14-*b* in FIG. 14) that is prepared in advance. The printer driver 603 then advances the processing to S1325.

On the other hand, if it is determined in S1322 that the paper type is not glossy paper, the printer driver 603 advances the processing to S1323.

In S1323, the printer driver 603 selects, as the first clear form color, rather bright gray from the color list table (14-*b* in FIG. 14) that is prepared in advance. The printer driver 603 then advances the processing to S1325.

The sheet type and color expression selected depending on the sheet type will be described in brief below. As in the above-described step S1312 where a color providing the matt expression is selected in the case of glossy paper, rather dark gray is selected in S1324 to provide the matt expression. However, the color providing the matt expression is not always required to rather dark gray. Further, as in the above-described step S1311 where a color providing the glossy expression is selected in the case of not glossy paper, rather bright gray is selected in S1323 to provide the glossy expression. However, the color providing the glossy expression is not always required to rather bright gray.

In S1325, the printer driver 603 corrects the color information to gray for gray conversion of the print data. The gray conversion of the print data can be executed by the known method and hence a detailed description thereof is omitted.

In S1326, the printer driver 603 sets the first clear form file color to the gray which has been selected in S1323 or S1324.

In S1327, the printer driver 603 determines whether the second clear-form color setting flag is turned ON or OFF. If the second clear-form color setting flag is turned OFF, the printer driver 603 brings the processing of the flowchart of FIG. 13 to an end directly.

On the other hand, it is determined in S1327 that the second clear-form color setting flag is turned ON, the printer driver 603 advances the processing to S1328 to set the second clear form color.

In S1328, the printer driver 603 sets the second clear form color. The second clear form color is set to gray with a shade differing from not only that of the gray selected as the first clear form color, but also that of gray used in the color correction in S1325. Thereafter, the printer driver 603 brings the processing of the flowchart of FIG. 13 to an end.

A color information list for the print data and a color list for the clear form will be described below with reference to FIG. 14.

FIG. 14 is a table showing examples of the color information list for the print data and the color list for the clear form.

In FIG. 14, a table 14-*a* represents an example of the color information list for the print data, which has been collected in the above-described step S908 of FIG. 9 and which is used for the determination in S1314 of FIG. 13.

Assuming an RGB color space with values of 0-255, the list table 14-*a* records, per page, color information of R (Red), G (Green) and B (Blue) values and the number of objects having each color combination. A list of objects may be recorded as information including object IDs and other items.

For example, the list table 14-*a* indicates that a page 1 contains one object having a color combination of R=255, G=173, and B=173 and one object having a color combination of R=200, G=200, and B=255.

In FIG. 14, a table 14-*b* represents an example of the color list for the clear form. The color list table 14-*b* is defined in advance and is stored in, e.g., the external storage 25 set in the host computer 11. The illustrated color list table 14-*b* has items indicating each ID, RGB values, classification (glossy/matt), and comment.

In the item "classification", the relevant color is defined as a color intended to provide the matt expression effect or a color intended to provide the glossy expression effect. For example, the list table 14-*b* indicates that "ID 1" is defined as a color having R=255, G=255, and B=153 and classified as providing the glossy expression. Further, a column "comment" states that the color defined as "ID 1" is bright yellow. In addition, IDs represent the sequence of priority and implies that color candidates can be selected in the ascending sequence from the color of ID=1.

Processing executed in the image input/output apparatus 3 in this exemplary embodiment will be described below with reference to a flowchart of FIG. 15.

Figure 15:
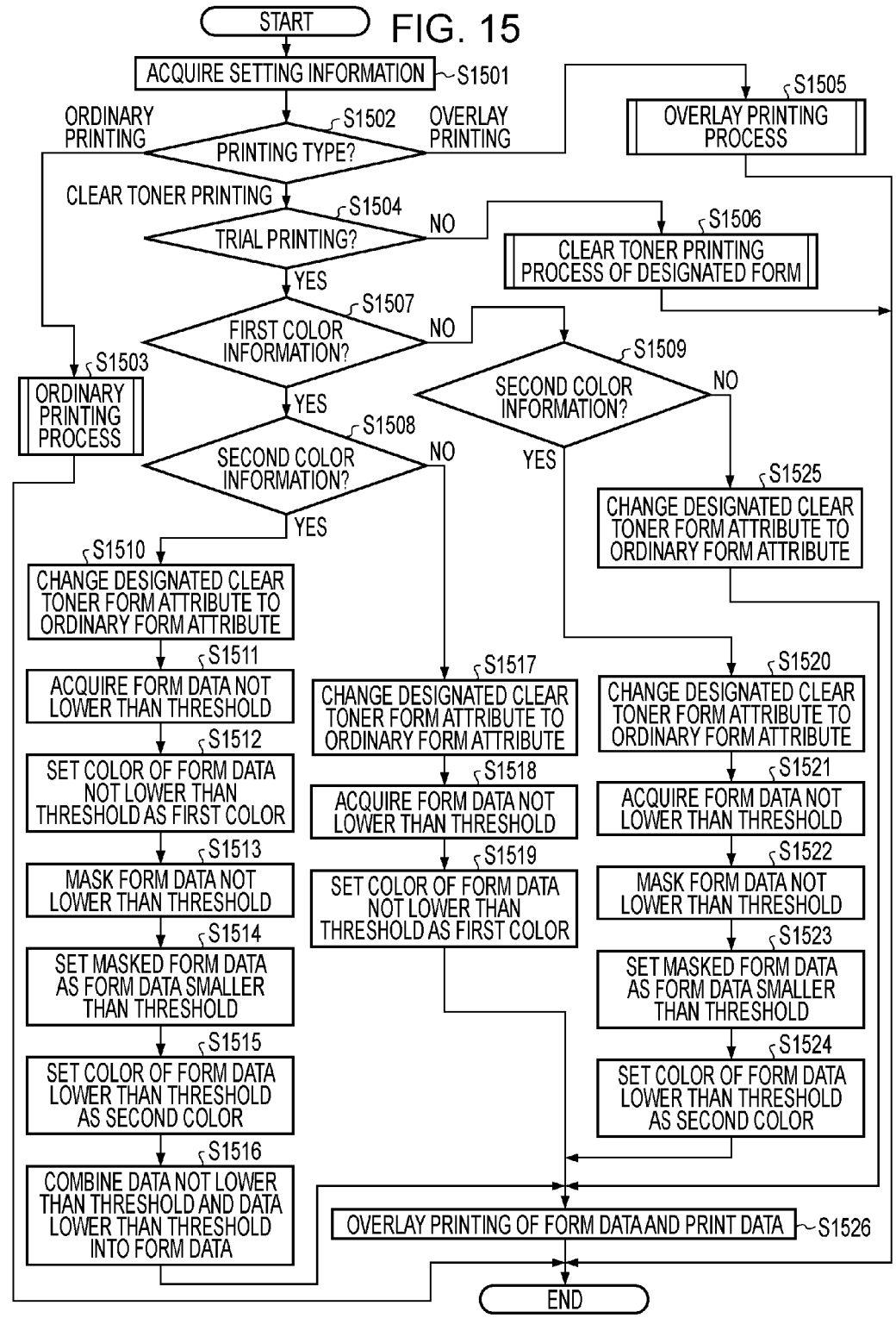
FIG. 15 is a flowchart illustrating processing executed in an image input/output apparatus illustrated in FIG. 1.

FIG. 15 is a flowchart illustrating the processing executed in the image input/output apparatus 3 illustrated in FIG. 1. The processing of the flowchart of FIG. 15 is executed in the core unit 10 illustrated in FIG. 3. The processing of the core unit 10 is implemented, as described above, under control of the CPU 123 in accordance with the control program stored in the memory 124.

When the print data (code data (PDL)) generated by the printer driver 603 (e.g., sent in S922 of FIG. 9) is acquired through the computer interface unit 7 in FIG. 3, the core unit 10 executes the following processing subsequent to S1501.

First, in S1501, the core unit 10 obtains various items of setting information (such as 1203 to 1212 in FIG. 12) in the acquired print data.

Then, in S1502, the core unit 10 determines, based on the various items of setting information obtained in S1501, whether the printing type of the print data is ordinary printing, clear toner printing, or overlay printing. If it is determined that the printing type is the ordinary printing, the core unit 10 advances the processing to S1503 in which an ordinary printing process of the print data is executed. Thereafter, the core unit 10 brings the processing of the flowchart of FIG. 15 to an end. A detailed description of the ordinary printing process is omitted.

If it is determined in S1502 that the printing type is the overlay printing, the core unit 10 advances the processing to S1505.

After executing an overlay printing process of the print data in S1505, the core unit 10 brings the processing of the flowchart of FIG. 15 to an end. The overlay printing process corresponds to the form file superimposing (overlay printing) process that has been described above regarding <Form File Storage Attribute>.

If it is determined in S1502 that the printing type is the clear toner printing, the core unit 10 advances the processing to S1504.

In S1504, the core unit 10 determines, based on the various items of setting information obtained in S1501, whether the printing mode of the print data is a trial printing mode. If it is determined that the printing mode is not the trial printing mode, the core unit 10 advances the processing to S1506.

After executing a clear toner printing process of the print data in S1506, the core unit 10 brings the processing of the flowchart of FIG. 15 to an end. The clear toner printing process corresponds to the clear toner superimposing (clear toner printing) process for the clear form file, which has been explained regarding <Clear Form File Storage Attribute> in the foregoing description of the core unit 10 with reference to FIG. 3.

On the other hand, if it is determined in S1504 that the printing mode of the acquired print data is the trial printing mode, the core unit 10 advances the processing to S1507.

In S1507, the core unit 10 determines whether the first color information is present in the print data. If it is determined that the first color information is present, the core unit 10 advances the processing to S1508.

In S1508, the core unit 10 determines whether the second color information is present in the print data. If it is determined that the second color information is present, the core unit 10 advances the processing to S1510.

In S1510, the core unit 10 changes the clear form file, which is stored as the clear form attribute, to the ordinary form file attribute so that the clear form file can also be handled as a form file for overlaying. As described later, however, processing with respect to the density threshold, etc. can be handled with the same processing as that for the clear form file.

In S1511, the core unit 10 executes the binarizing process to obtain form data not lower than the density threshold from the clear form file, as described above in the clear toner superimposing (clear toner printing) process for the clear form file, which has been explained regarding <Clear Form File Storage Attribute>. The binarized form data is, as described above, temporarily stored in the memory 124. The form data not lower than the density threshold can also be temporarily stored in the memory 124.

In S1512, the core unit 10 sets a printing color of the form data not lower than the density threshold, which has been acquired in S1511, as the first color information designated in the print data. Because the form data is binarized, the color of the form data can be expressed with only the first color information. While the first color information is provided based on the RGB color space in this exemplary embodiment, the first color information may be converted to a YMCK color space that is handled in the core unit 10. Through the steps described above, setting is made on part of the clear form file designating the region where the clear toner is coated, and the color of that region.

In S1513, the core unit 10 executes a process of obtaining clear form data lower than the density threshold. In this process, the core unit 10 executes masking on the clear form file, which is temporarily stored in the memory 124, to exclude the form data not lower than the density threshold, which has been acquired in S1511 and stored in the memory 124. As a result, the form data lower than the density threshold can be acquired.

In S1514, the core unit 10 sets the clear form data, which has been acquired in S1513, as a clear form file lower than the density threshold.

In S1515, the core unit 10 sets color data of the clear form file, which has been set in S1514, as the second color information. While the second color information is provided based on the RGB color space in this exemplary embodiment, the second color information may be converted to a YMCK color space that is handled in the core unit 10, as with the first color information described above regarding S1512. Through the steps described above, setting is made on part of the clear form file designating the region where the clear toner is not coated, and the color of that region.

In S1516, the core unit 10 combines (superimposes) the form file not lower than the density threshold and the form file lower than the density threshold into a new overlay form file. Then, the core unit 10 advances the processing to S1526.

On the other hand, if it is determined in S1508 that the second color information is not present in the print data, the core unit 10 advances the processing to S1517.

S1517 to S1519 represent steps of acquiring the form file data not lower than the density threshold. Processing executed in S1517 to S1519 is the same as that executed in the above-described steps S1510 to S1512 and hence a detailed description thereof is omitted. After setting a color of the form file data not lower than the density threshold as the first color information in S1519, the core unit 10 advances the processing to S1526.

If it is determined in S1507 that the first color information is not present in the print data, the core unit 10 advances the processing to S1509.

In S1509, the core unit 10 determines whether the second color information is present in the print data. If it is determined that the second color information is present, the core unit 10 advances the processing to S1520. S1520 to S1524 represent steps of acquiring the form file data lower than the density threshold and setting the second color. Processing executed in S1520 and S1521 is the same as that executed in the above-described steps S1510 and S1511. Also, processing executed in S1522 and S1523 is the same as that executed in the above-described steps S1513 and S1514. Further, processing executed in S1524 is the same as that executed in the above-described step S1515. Hence, a detailed description of S1520 to S1524 is omitted. After completion of the processing of S1524, the core unit 10 advances the processing to S1526.

On the other hand, if it is determined in S1509 that the second color information is not present in the print data, the core unit 10 advances the processing to S1525.

In S1525, as in S1510, the core unit 10 changes the clear form file, which is stored as the clear form attribute, to the ordinary form file attribute, thus generating new form data. Thereafter, the core unit 10 advances the processing to S1526.

In S1526, the core unit 10 prints the newly set form data, which has been subjected to the above-described color setting, to be output in an overlay (superimposed) relation to the print data. Thereafter, the core unit 10 brings the processing of the flowchart of FIG. 15 to an end.

In this exemplary embodiment, semitransparent color information can also be set as the first color information and the second color information. In such a case, the first color information and the second color information are set as semitransparent color information in S909 of FIG. 9.

Further, this exemplary embodiment can be modified so as to output only contour information for the clear form data that has been set to the first color information, and for the clear form data that has been set to the second color information. In such a modification, a process of extracting the contour of the form data is added to S1526 of FIG. 15, following which the obtained contour information is combined (superimposed) with the print data.

As described above, the printer driver 603 in the first exemplary embodiment is configured such that, when the test print of the clear toner printing is performed, the printer driver 603 sends the print job, illustrated in FIG. 12, to the image input/output apparatus 3. The print job includes the document data (1201 to 1202), the information (1203, 1204 and 1207) instructing the test print of the clear toner printing, and the information (1206) designating the form data, which is to be used, from the form data group registered in the image input/output apparatus 3. Further, the print job includes the information (1210) designating the printing to be performed in the first color on the region where the clear toner is coated, and the information (1211) designating the printing to be performed in the second color on the region where the clear toner is not coated. Still further, the print job includes the information (1209) that instructs the printing of the incidental information indicating that the first color represents the region where the clear toner is coated, and the incidental information indicating that the second color represents the region where the clear toner is not coated. Still further, the print job includes the information (1212) instructing change of the sheet type to plain paper when the selected sheet type is special paper.

Also, the image input/output apparatus 3 in the first exemplary embodiment is configured such that, when the test print of the clear toner printing is performed, the color toners are used instead of the clear toner to print, in a discernible manner (i.e., in the first color and the second color), the region where the clear toner is coated in the printing using the clear toner and the region where the clear toner is not coated in the printing using the clear toner.

Thus, the first exemplary embodiment can provide the trial printing function enabling the user to confirm the overlapped state of the clear toner form and the document data with good legibility without additional billing for the clear toner printing.

Further, even a printing apparatus with no printing function using the clear toner enables the user to confirm the effect of the clear toner printing by the printer driver 603 in the first exemplary embodiment, which instructs the printing apparatus with no printing function using the clear toner to perform the printing in the above-described manner.

Second Exemplary Embodiment

The configuration of a printing system according to a second exemplary embodiment of the present invention will be described below with reference to FIGS. 16 to 19.

In the second exemplary embodiment, when the clear toner printing is performed, the printer driver 603 displays a preview of the trial printing.

Figure 16:
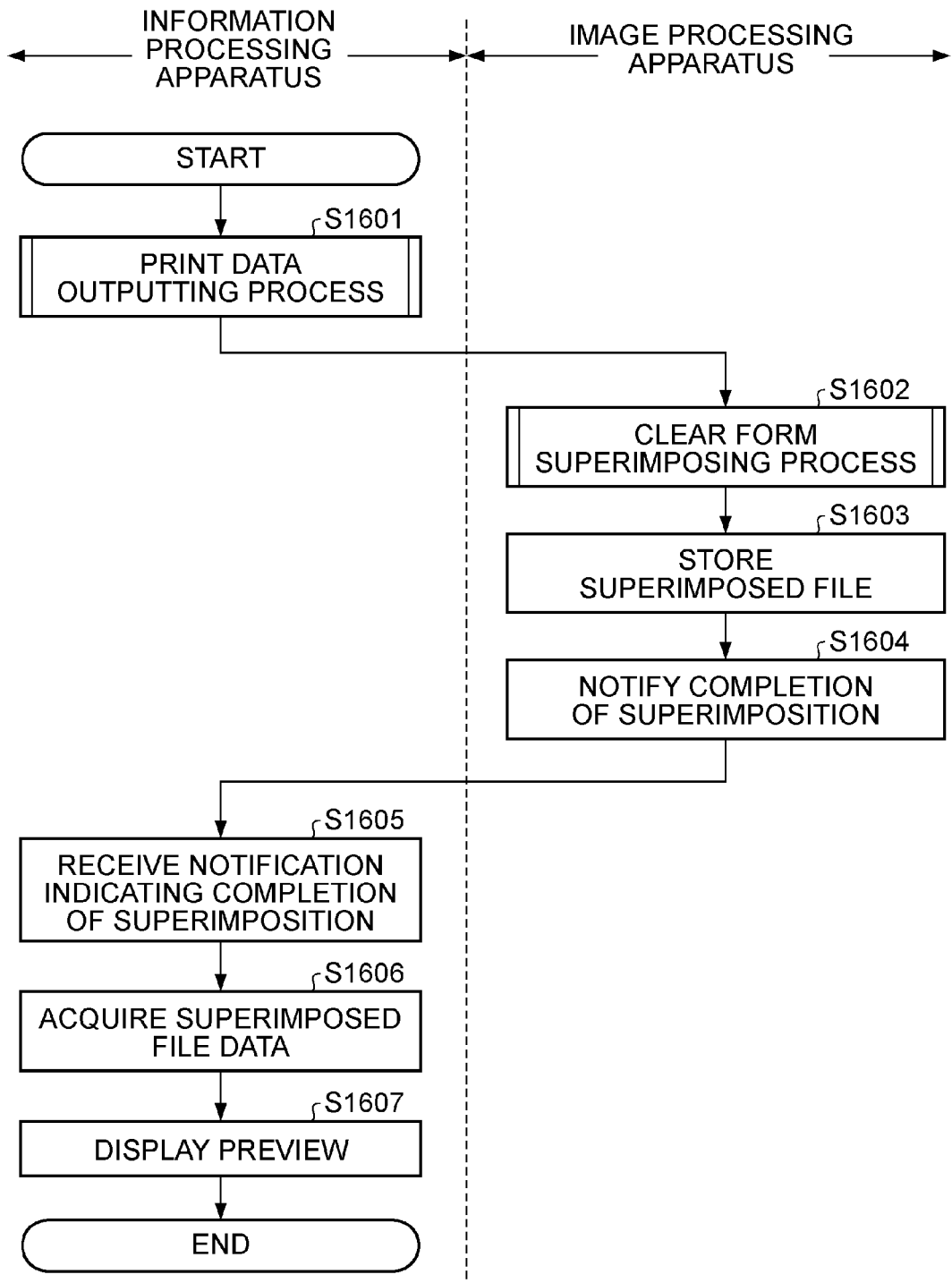
FIG. 16 is a flowchart illustrating an example of operation in a printing system according to a second exemplary embodiment of the present invention.

FIG. 16 is a flowchart illustrating an example of operation in the printing system according to the second exemplary embodiment of the present invention. In FIG. 16, steps (S1601 and S1605 to S1607) illustrated in the left half represent a processing flow in the host computer 11, which is executed by the printer driver 603. The printer driver 603 executes the processing as follows. When the user instructs execution of printing from an application in a state where preview outputting is set in the printer driver 603, the printer driver program stored in, e.g., the external storage 25, illustrated in FIG. 5, is loaded into the RAM 31 and the processing of the flowchart of FIG. 16 is executed by the CPU 34. Steps (S1602 to S1604) illustrated in the right half represent a processing flow in the image input/output apparatus 3, which is executed by the core unit 10 illustrated in FIG. 3. The processing in the core unit 10 is implemented, as described above, under control of the CPU 123 in accordance with the control program stored in the memory 124.

First, in S1601, the printer driver 603 in the host computer 11 executes a process of outputting the print data to the image input/output apparatus 3. This outputting process is similar to the process, which has been described above in connection with the flowchart of FIG. 9, except that setting of a printing style is added. Accordingly, only points differing from the flowchart of FIG. 9 is described here. When a preview is instructed as the printing style in the setting values acquired in S901, the printer driver 603 sends, to the image input/output apparatus 3, the print data including information (1801 in FIG. 18 described later) to set the preview outputting (display of the preview) as an output style. A user interface (UI) for instructing the preview will be described below with reference to FIG. 17.

Figure 17:
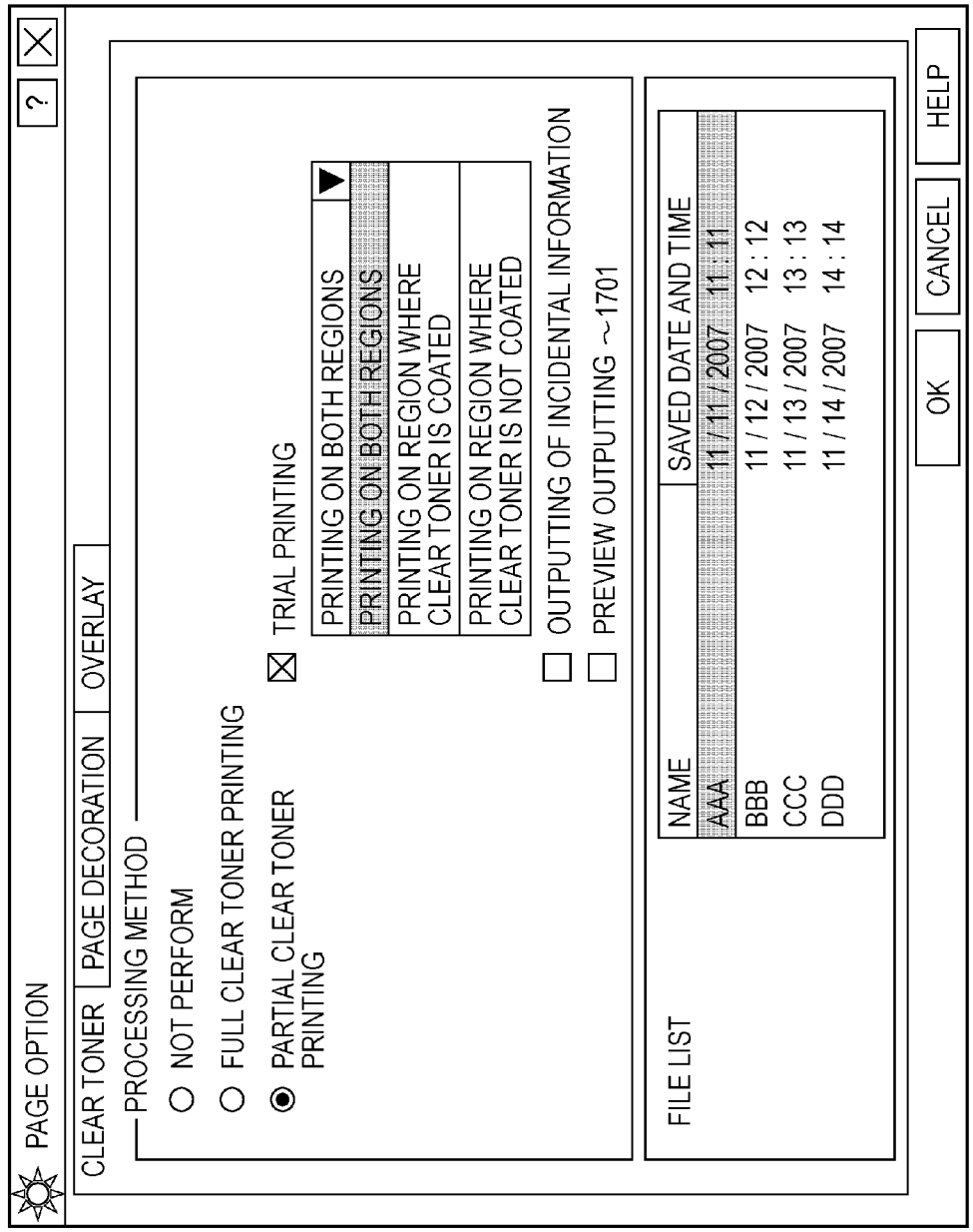
FIG. 17 illustrates an example of a user interface for instructing the printer driver to output a preview as an output style of the print data.

FIG. 17 illustrates an example of the user interface for instructing the printer driver 603 to output the preview as the output style of the print data. The user interface is displayed on the display unit 24 of the host computer 11.

In FIG. 17, reference numeral 1701 denotes a check box instructing whether the preview is output. When the check box 1701 is turned on, the print data including the setting to designate the preview outputting as the output style is generated in S1601 of FIG. 16 and is output to the image input/output apparatus 3. The print data including the setting to designate the preview outputting as the output style is now described with reference to FIG. 18.

FIG. 18 illustrates an example of details of the print data sent in S1601 of FIG. 16, in which the preview outputting is set as the output style.

The print data illustrated in FIG. 18 differs from the print data illustrated in FIG. 12 according to the first exemplary embodiment in that "<output style>" 1801 is added.

In the illustrated example of FIG. 18, the "<output style>" 1801 is set to "preview outputting".

The description is continued by referring to FIG. 16 again.

The processing is then shifted to the image input/output apparatus 3 to execute S1602.

In S1602, the image input/output apparatus 3 executes a clear form superimposing process. The clear form superimposing process is similar to that represented by S1501 to S1525 in the flowchart of FIG. 15. It is, however, to be noted that "trial printing" in S1504 of FIG. 15 is replaced with "preview outputting". Stated another way, in S1504, the core unit 10 executes control so as to advance the processing to S1507 when the output style of the print data is set to "preview outputting".

In next step S1603, the image input/output apparatus 3 executes a process of storing the file which has been superimposed in S1602. This step corresponds to a process of storing, in S1526 in the flowchart of FIG. 15, the superimposed data without actually outputting the same. In other words, after overlaying (superimposing) the form data, which has been newly set and for which a color has been designated, with the print data, the superimposed data is stored in, e.g., the storage unit 5 illustrated in FIG. 3.

In next step S1604, the image input/output apparatus 3 sends a WSD event, which indicates the end of the superimposing process, toward the printer driver in the host computer by utilizing the auto-configuration function that has been described above with reference to FIG. 7. A route for sending the WSD event is the route F illustrated in FIG. 7. On that occasion, the image input/output apparatus 3 can also send the WSD event together with information of the superimposed file, e.g., an ID of the superimposed file which is recognizable by the printer driver.

The processing is then shifted to the information processing apparatus to execute S1605.

In S1605, the printer driver 603 receives the WSD event, including the information of the superimposed file, which has been sent from the image input/output apparatus 3 in S1604, by utilizing the auto-configuration function. A route for obtaining the WSD event is provided by the routes E and D in FIG. 7.

In next step S1606, the printer driver 603 acquires the superimposed file data, which has been stored in the image input/output apparatus 3 in S1603 after the end of the superimposing process, from the image input/output apparatus 3 in accordance with the information of the superimposed file. Herein, the printer driver 603 utilizes, e.g., the dynamic configuration function using the routes G and H, which have been described above with reference to FIG. 7.

In next step S1607, the printer driver 603 executes display control so as to display a preview (FIG. 19) of the superimposed file data, which has been acquired in S1606, on the display unit 24. A preview display screen may be displayed as a popup screen on the display unit 24 after receiving the WSD event in S1605.

Figure 19:
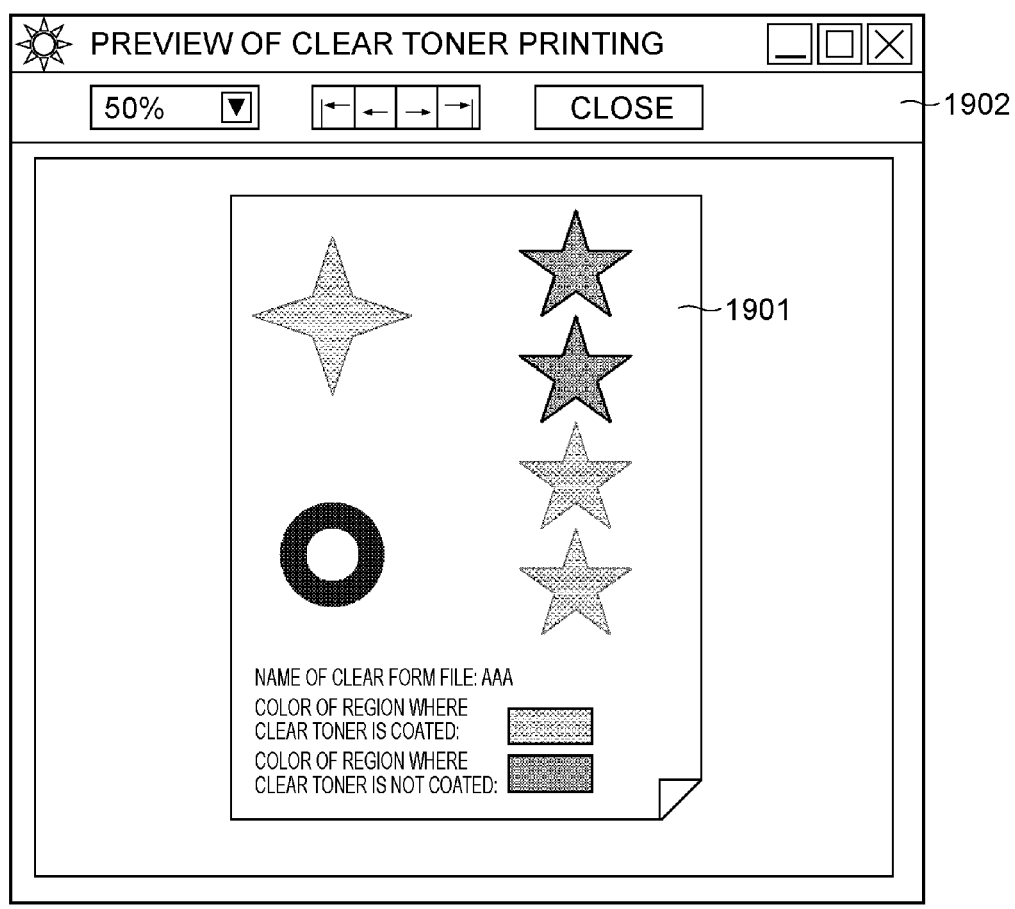
FIG. 19 illustrates an example of a clear-toner printing preview screen displayed on the host computer.

FIG. 19 illustrates an example of a clear-toner printing preview screen displayed on the host computer 11.

In FIG. 19, reference numeral 1901 denotes an example of a preview image displayed. Reference numeral 1902 denotes an example of a menu of the displayed preview screen. The displayed menu includes buttons indicating, for example, a display scaling factor, page turning to the next page and the previous page, and closing of a window.

Other buttons may be additionally displayed which instruct, e.g., actual "trial printing" and actual "clear toner printing" after display of the preview, if there are no problems on the preview.

As described above, the printer driver 603 in the second exemplary embodiment is configured such that, when the preview of the clear toner printing is displayed, the printer driver 603 sends the print job, illustrated in FIG. 18, to the image input/output apparatus 3. The print job includes the document data, the information (1801) instructing the preview of the clear toner printing to be displayed, and the information designating the form data, which is to be used, from the form data group registered in the image input/output apparatus 3. Further, the print job includes the information designating the printing to be performed in the first color on the region where the clear toner is coated, and the information designating the printing to be performed in the second color on the region where the clear toner is not coated. Still further, the print job includes the information that instructs the printing of the incidental information indicating that the first color represents the region where the clear toner is coated, and the incidental information indicating that the second color represents the region where the clear toner is not coated.

Also, the image input/output apparatus 3 in the second exemplary embodiment executes the clear form superimposing process (S1602) when the preview of the clear toner printing is displayed.

Moreover, the printer driver 603 is configured so as to obtain the superimposed data of the form data and the document data, which has been generated based on the sent print job, from the image input/output apparatus 3 (S1606) and to display the preview of the superimposed data (S1607).

Thus, the second exemplary embodiment can provide the function of providing the preview of the clear toner printing, which enables the user to confirm the overlapped state of the clear toner form and the document data with good legibility without additional billing for the clear toner printing.

Third Exemplary Embodiment

In the second exemplary embodiment, the image input/output apparatus 3 executes the clear form superimposing process based on the print data sent from the printer driver 603, and the printer driver 603 displays the preview of the clear toner printing. In contrast, a third exemplary embodiment of the present invention is configured such that the printer driver 603 acquires the form data and the density threshold from the image input/output apparatus 3 and executes the clear form superimposing process to perform the trial printing or to display the preview.

The operation of the third exemplary embodiment of the present invention will be described below with reference to FIGS. 20 and 21.

Figure 20:
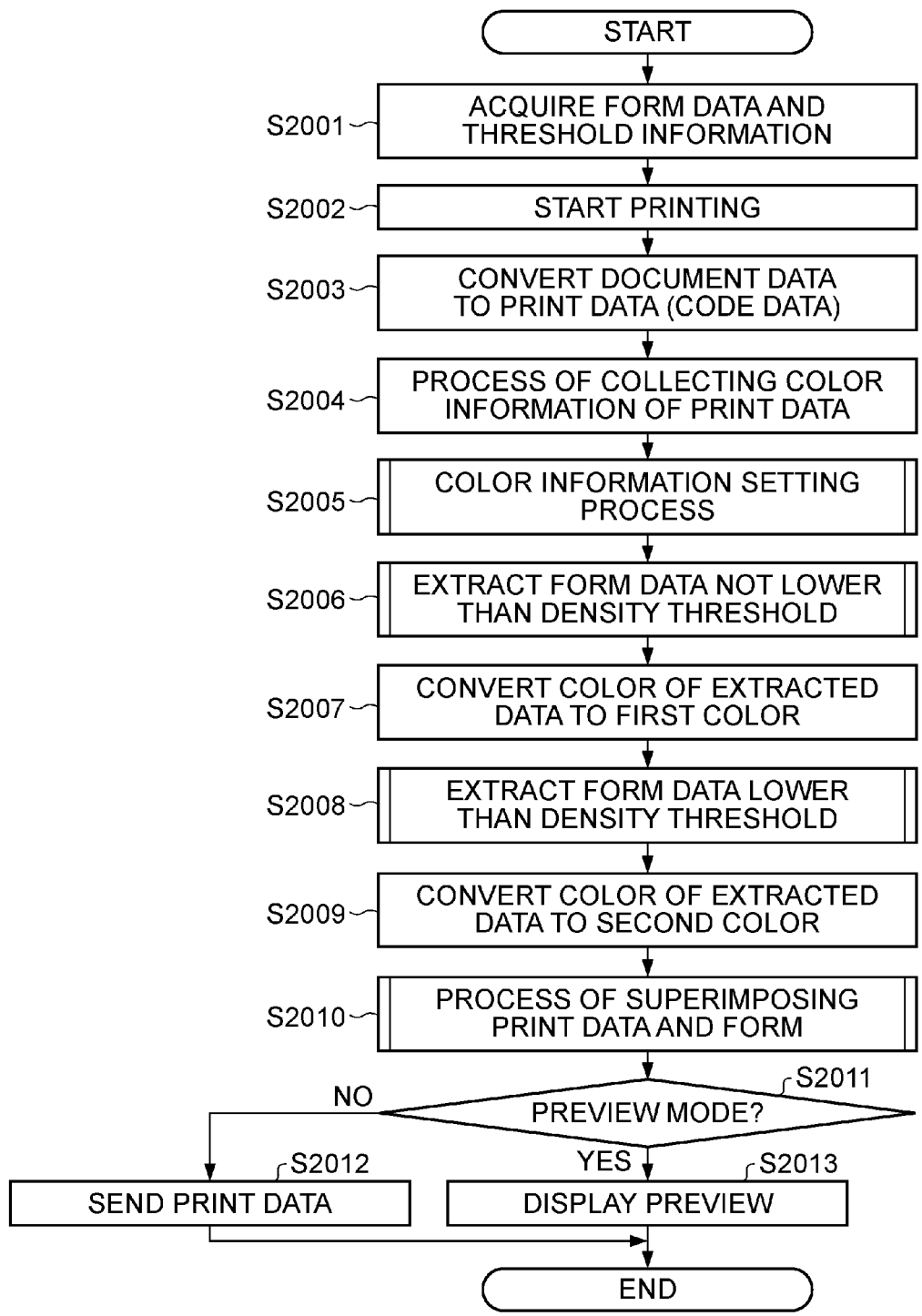
FIG. 20 is a flowchart illustrating a processing flow executed in the printer driver according to a third exemplary embodiment of the present invention.

FIG. 20 is a flowchart illustrating a processing flow executed in the printer driver 603 according to the third exemplary embodiment of the present invention. When the user instructs execution of printing from an application, the printer driver program stored in, e.g., the external storage 25, illustrated in FIG. 5, is loaded into the RAM 31 and the processing of the flowchart of FIG. 20 is executed by the CPU 34. The following description is made on the premise that the "clear toner printing" and the "trial printing mode" are already set. The other modes are executed in the same manner as those described above with reference to FIGS. 9, 13 and 16, and hence a detailed description there of is omitted.

First, in S2001, the printer driver 603 acquires the form data and the density threshold, which are registered in the image input/output apparatus 3, by utilizing the dynamic configuration function described above with reference to FIG. 7. The form data acquired here is assumed to be the data instructed by the operator, but all the registered data can also be acquired instead. The form data and the density threshold are in a state stored in the storage unit 5 described above with reference to FIG. 3. When the instruction to acquire the form data is received by the computer interface unit 7, the form data and the density threshold both stored in the storage unit 5 are transferred in the image input/output apparatus 3 to the computer interface unit 7 through the I/F 120 in the core unit 10 under control of the core unit 10. The form data and the density threshold are then sent to the host computer 11.

If the density threshold cannot be obtained from the image input/output apparatus 3, a dialog may be displayed on the display unit 26, thus prompting the user to manually input the density threshold by using, e.g., the KB 23 or the mouse.

Then, in S2002, the printer driver 603 starts the printing process upon receiving a print instruction from the operator.

In S2003, the printer driver 603 converts the document data to print data (also called code data (PDL)).

In S2004, the printer driver 603 executes a process of collecting the color information of the print data, which has been converted in S2003. The color information collecting process executed in S2004 is similar to the process executed in S908 of FIG. 9. Stated another way, information of colors used in the print data is collected in S2004 to prepare a color list.

In S2005, the printer driver 603 executes a color information setting process to set the first color information and the second color information. The color information setting process in S2005 is similar to the process in S909 (detailed in FIG. 13) of FIG. 9, and hence a detailed description thereof is omitted.

In S2006, the printer driver 603 extracts data not lower than the density threshold, which has been obtained in S2001, from the form data which has also been obtained in S2001. The process of extracting the data not lower than the density threshold in S2006 is similar to the process in S1511 of FIG. 15. It is, however, to be noted that, while the extracting process in FIG. 15 is executed by the image input/output apparatus 3, a similar extracting process is executed in S2006 by the printer driver 603 in the host computer 11.

In S2007, the printer driver 603 converts a color of the data not lower than the density threshold, which has been extracted in S2006, to the first color which has been set in S2005.

In S2008, the printer driver 603 extracts data lower than the density threshold, which has been obtained in S2001, from the form data which has also been obtained in S2001. The process of extracting the data lower than the density threshold in S2008 is similar to the process in S1513 and S1514 of FIG. 15.

In S2009, the printer driver 603 converts a color of the data lower than the density threshold, which has been extracted in S2008, to the second color which has been set in S2005.

In S2010, the printer driver 603 superimposes (combines) the print data, which has been converted in S2003, with the form file which has been converted in S2007 and S2009. While the superimposing process in S2010 includes a color space converting process, it is similar to the overlaying process executed by the ordinary printer driver, and hence a detailed description thereof is omitted.

In S2011, the printer driver 603 determines whether the preview mode is instructed. The preview mode can be instructed by the operator from the printer driver UI (see 1701 in FIG. 21). If it is determined that the preview mode is instructed, the printer driver 603 advances the processing to S2013.

In S2013, the printer driver 603 displays, as a preview, the data superimposed in S2010 on the display unit 24. Thereafter, the printer driver 603 brings the processing of the flowchart of FIG. 20 to an end.

On the other hand, if it is determined in S2011 that the preview mode is not instructed, the printer driver 603 advances the processing to S2012. In S2012, the printer driver 603 sends the print data superimposed in S2010 to the image input/output apparatus 3. Thereafter, the printer driver 603 brings the processing of the flowchart of FIG. 20 to an end.

A user interface (UI) for instructing the preview setting will be described below with reference to FIG. 21.

Figure 21:
FIG. 21 illustrates an example of a user interface for instructing preview setting in the third embodiment of the present invention.

FIG. 21 illustrates an example of the user interface for instructing the preview setting in the third embodiment of the present invention. The UI is displayed on the display unit 24 of the host computer 11.

In FIG. 21, reference numeral 2101 denotes an information acquisition button to obtain the information (such as the form file list, the density threshold, and the particular form data) that is stored in the image input/output apparatus 3. Upon the information acquisition button 2101 being pressed, the printer driver 603 obtains the form data and the density threshold as described above in connection with S2001 of FIG. 20.

Reference numeral 2102 denotes a displayed value of the density threshold, which has been obtained with pressing of the information acquisition button 2101.

As described above, when the test print or the preview of the clear toner printing is performed or displayed, the printer driver 603 in the third exemplary embodiment obtains the form data, which is to be used, from the form data group registered in the image input/output apparatus 3 (S2001 of FIG. 20). Also, the printer driver 603 converts the color of the region where the clear toner is coated, which region is designated in the obtained form data, to the first color (S2007), and converts the color of the region where the clear toner is not coated, which region is designated in the obtained form data, to the second color (S2009). Further, the printer driver 603 superimposes (combines) the converted form data and the document data with each other (S2010). Still further, the printer driver 603 sends the print job of the superimposed data to the image input/output apparatus 3 (S2012). Alternatively, the printer driver 603 displays the superimposed data as a preview (S2013).

Thus, as seen from the above description, the third exemplary embodiment can provide the function of providing the preview of the trial printing, which enables the user to confirm the overlapped state of the clear toner form and the document data with good legibility without additional billing for the clear toner printing.

Further, even a printing apparatus with no printing function using the clear toner enables the user to confirm the effect of the clear toner printing by the printer driver 603 in the third exemplary embodiment, which instructs the printing apparatus with no printing function using the clear toner to perform the printing (S2012).

Fourth Exemplary Embodiment

A fourth exemplary embodiment will be described below in connection with the case where the user causes information, designated by the user, to be drawn into the clear form file by using the printer driver 603.

<Information Embedding Registration for Clear Form File>

Figure 22:
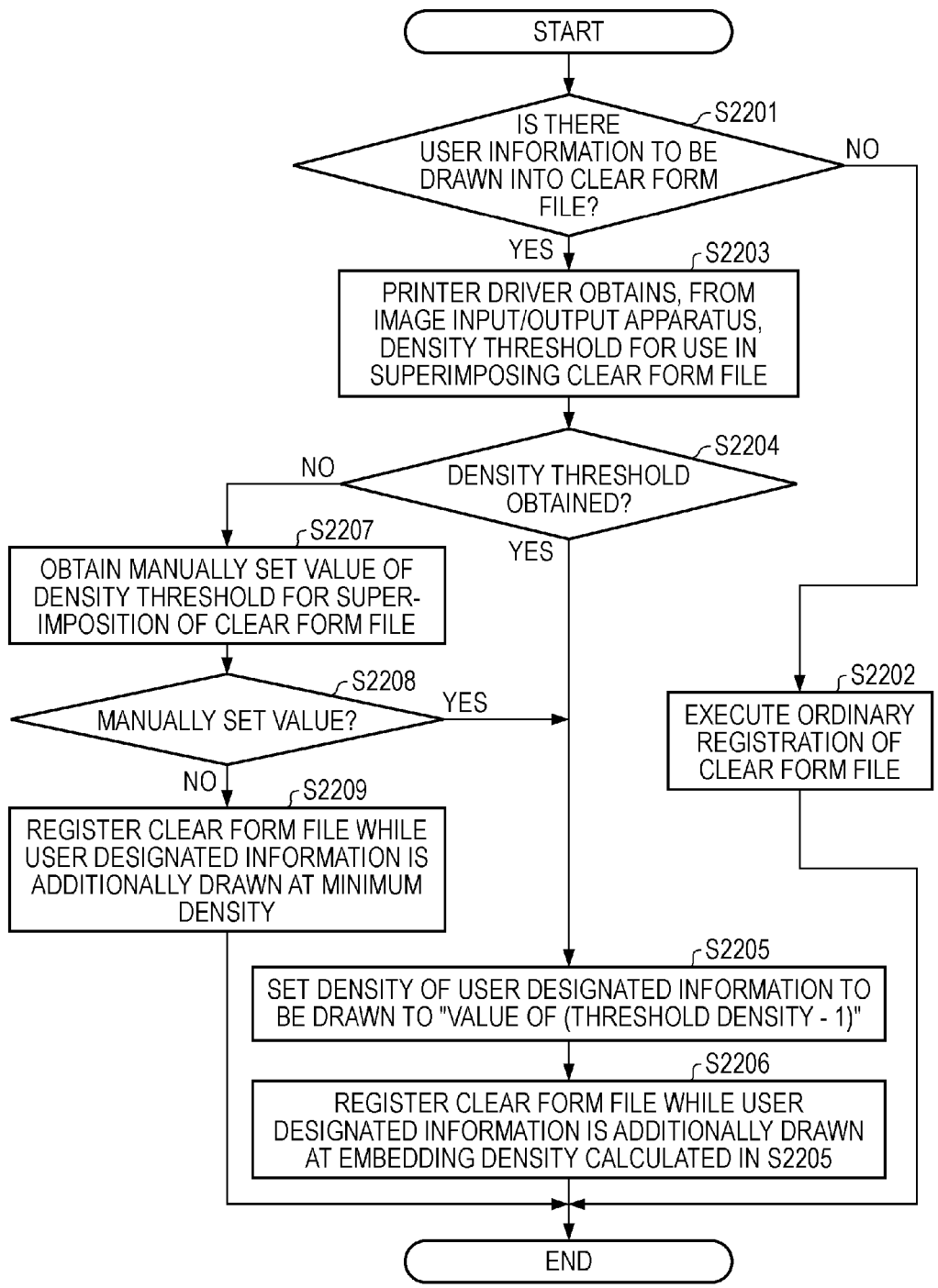
FIG. 22 is a flowchart illustrating a processing flow when information designated by a user is drawn into a clear form file and registered in the image input/output apparatus.

FIG. 22 is a flowchart illustrating a processing flow when information designated by the user is drawn into the clear form file and registered in the image input/output apparatus 3. When the user instructs execution of printing from an application in a state where "generate clear form file" (see 2304 FIG. 23) is set as the processing method in the printer driver 603, the printer driver program stored in, e.g., the external storage 25, illustrated in FIG. 5, is loaded into the RAM 31 and the processing of the flowchart of FIG. 22 is executed by the CPU 34.

First, the printer driver 603 determines whether there is information that is designated by the user and is to be drawn into the clear form file. Details of this determination will be described below with reference to FIG. 23.

Figure 23:
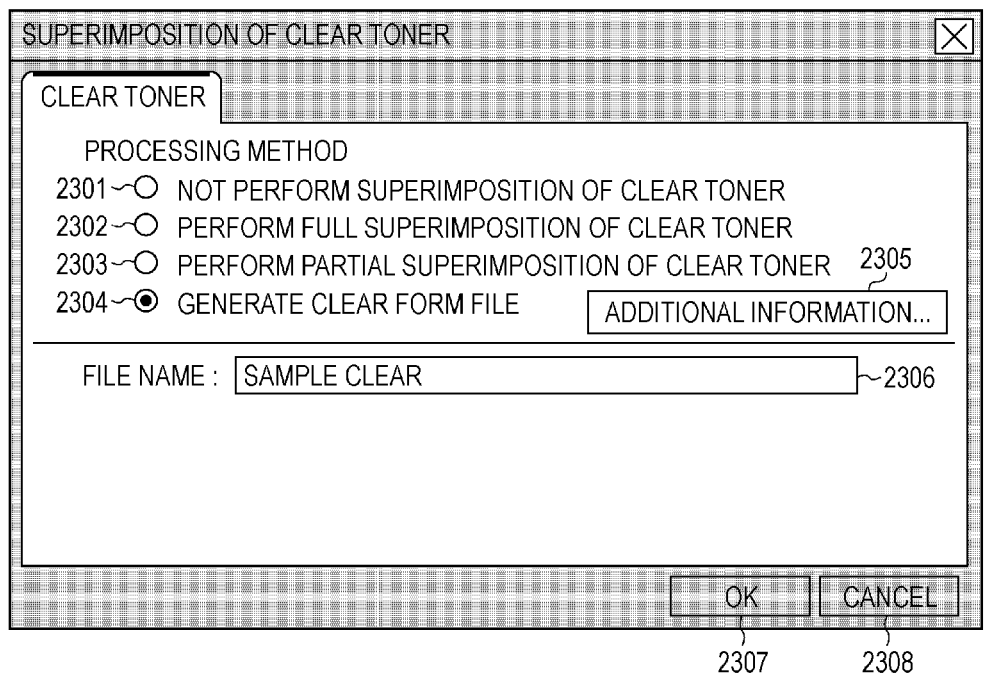
FIG. 23 illustrates a dialog which is displayed on a display unit by the printer driver and which is employed by the user to instruct registration or superimposition of the clear form file.

FIG. 23 illustrates a dialog which is displayed on the display unit 24 by the printer driver 603 and which is employed by the user to instruct registration or superimposition of the clear form file.

In the dialog of FIG. 23, reference numerals 2301 to 2304 serve to designate how the clear form file is to be handled.

When the user designates an option 2301, i.e., "not perform superimposition of clear toner", and the user instructs printing, the ordinary printing is executed. When the user designates an option 2302, i.e., "perform full superimposition of clear toner", and the user instructs printing, a process of coating the clear toner over the entire print surface is executed in addition to the ordinary printing.

When the user designates an option 2303, i.e., "perform partial superimposition of clear toner", a process of outputting a print with superimposition of the clear toner is executed by using, as the clear form file, a file that is designated by the user in a file name control box 2306. In the example illustrated in FIG. 23, when the partial superimposition of the clear toner is performed, the user directly designates the file name in a region of the control box 2306. As an alternative, the file name can also be designated by a method of causing the image input/output apparatus 3 to obtain a list of file names of the registered clear form files by utilizing the above-described dynamic configuration function, displaying the list of file names in the region of the control box 2306, and prompting the user to select one of the file names.

When the user designates an option 2304, i.e., "generate clear form file", a document to be subjected to the printing process is registered as the clear form file in the image input/output apparatus 3. The registration can be executed in the same manner as that described above. When the option 2304, i.e., "generate clear form file", is selected, the user can embed additional information in the clear form file, which is to be registered, by pressing an "additional information" button 2305 and displaying a dialog (FIG. 24).

Figure 24:
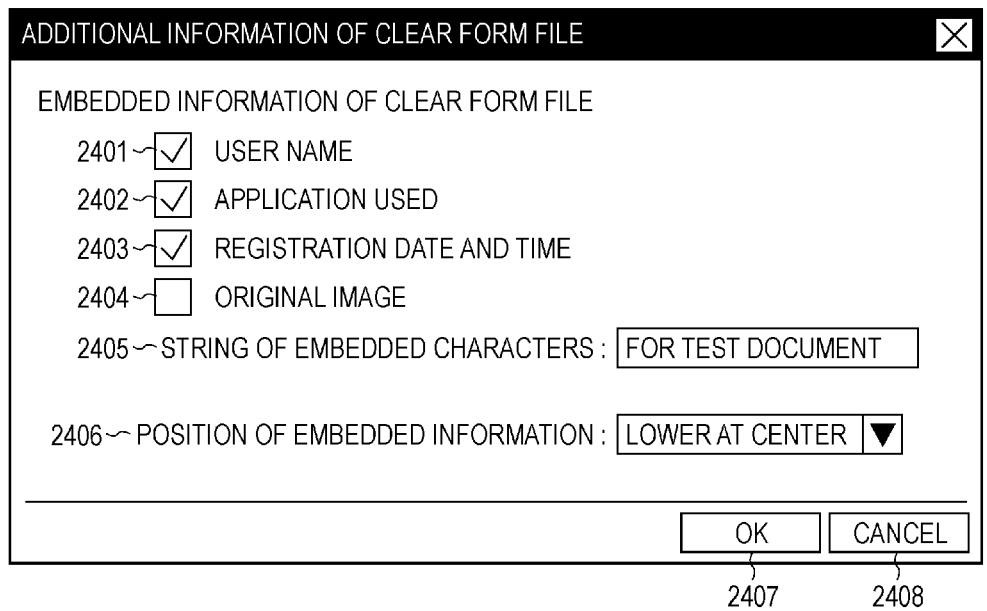
FIG. 24 illustrates a dialog displayed when an additional information button is pressed.

FIG. 24 illustrates the dialog displayed when the additional information button 2305 is pressed. The dialog is displayed on the display unit 24. On the displayed dialog, the user can select the type of information to be added.

In FIG. 24, reference numeral 2401 denotes a check box for designating whether the user name is drawn into the clear form file. Reference numeral 2402 denotes a check box for designating whether the name of an application, which is used in registering the clear form file, is drawn into the clear form file.

Reference numeral 2403 denotes a check box for designating whether the registration date and name are drawn into the clear form file. Reference numeral 2404 denotes a check box for designating whether a thumbnail image of an original image is drawn into the clear form file. Reference numeral 2405 denotes an edit box for inputting a character string which is to be embedded in the clear form file and which can be arbitrarily designated by the user.

Reference numeral 2406 denotes a drop list allowing the user to selectively designate the drawing position of the information that has been designated in 2401 to 2405 to be drawn into the clear form file.

Reference numeral 2408 denotes a button for canceling the information designated on the dialog of FIG. 24 and then closing the dialog. Reference numeral 2407 denotes a button for saving the information designated on the dialog of FIG. 24 and then closing the dialog.

The fourth exemplary embodiment is described, for example, in connection with the case where the user designates the following items:

user name: ON, application used: ON, registration date and time: ON, original image: OFF, string of embedded characters: "for test document", and position of embedded information: lower at center The description is now made for the flowchart of FIG. 22.

In S2201, the printer driver 603 determines whether there is information that is designated by the user to be drawn into the clear form file. If the user designates nothing in the dialog, illustrated in FIG. 24, for designating the additional information, the printer driver 603 advances the processing to S2202 based on the determination that there is no information to be drawn into the clear form file.

In S2202, the printer driver 603 sends the clear form file, as it is, to the image input/output apparatus 3. The clear form file is thereby registered in the image input/output apparatus 3. After the end of the process in S2202, the printer driver 603 brings the processing of the flowchart of FIG. 22 to an end.

In the example of the designation illustrated in FIG. 24, the drawing information designated by the user is present as described above. Therefore, the printer driver 603 determines in S2201 that there is the user-designated information to be drawn into the clear form file, and then advances the processing to S2203.

In S2203, the printer driver 603 obtains the density threshold from the image input/output apparatus 3 by utilizing the dynamic configuration function. In this step, the printer driver 603 cannot often obtain the density threshold for some reason, such as a situation that the connection destination of the printer driver 603, e.g., a print server, is not directly connected to the image input/output apparatus 3. Accordingly, the printer driver 603 determines in S2204 whether the density threshold has been obtained.

If it is determined in S2204 that the density threshold has been obtained, the printer driver 603 advances the processing to S2205.

In S2205, the printer driver 603 defines the density of the information, which is to be drawn into the clear form file, to a value of "density threshold−1". For example, when density is expressed in values of 0 to 255 with 1 byte and the density threshold is "240", the density of the information to be drawn is set to "240−1=239" in S2205.

In S2206, the printer driver 603 draws the user designated information into the clear form file at the density, which has been defined in S2205, and then sends the clear form file to the image input/output apparatus 3. The clear form file is thereby registered in the image input/output apparatus 3. After the end of the process in S2206, the printer driver 603 brings the processing of the flowchart of FIG. 22 to an end.

On the other hand, if it is determined in S2204 that the density threshold has not been obtained, the printer driver 603 advances the processing to S2207.

Figure 25:
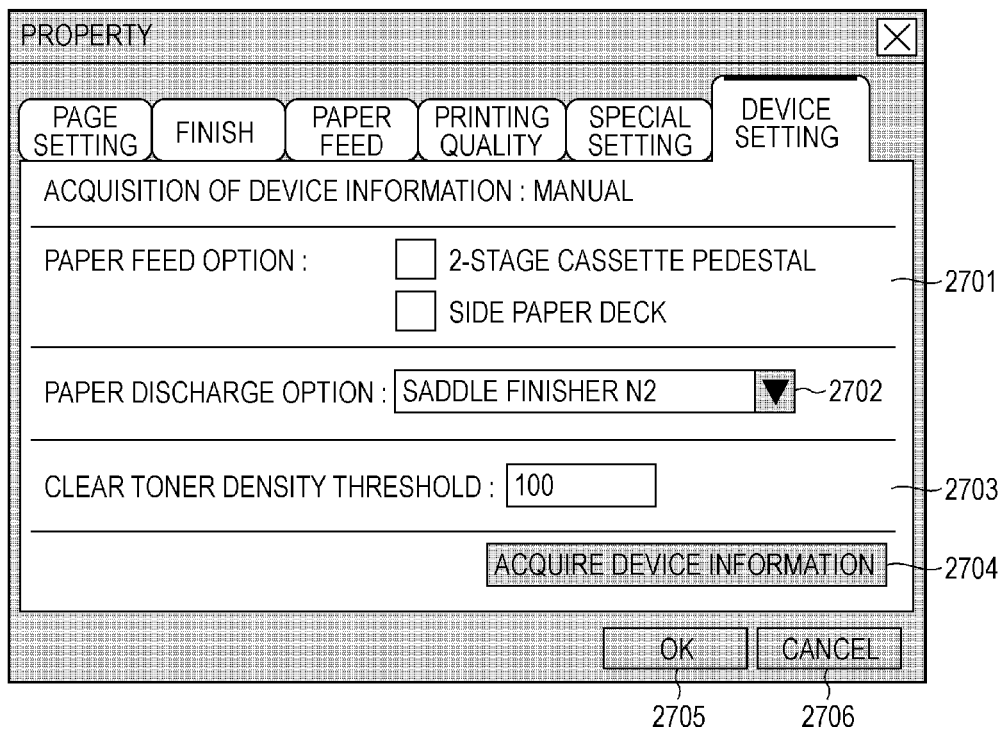
FIG. 25 illustrates a device setting dialog displayed on the display unit by the printer driver.

In S2207, the printer driver 603 obtains a value of the density threshold, which is manually set by the user on a dialog illustrated in FIG. 25. This step is described in more detail with reference to FIG. 25.

FIG. 25 illustrates a device setting dialog displayed on the display unit 24 by the printer driver 603. The dialog of FIG. 25 causes the device configuration information of the image input/output apparatus 3 to be acquired by utilizing the above-described dynamic configuration. If the device configuration information is not acquired in such a manner, the dialog enables the user to manually set the device configuration information.

In FIG. 25, reference numeral 2704 denotes a button for instructing the printer driver 603 to acquire the device configuration information of the image input/output apparatus 3 with the dynamic configuration function. When the device configuration information cannot be acquired even with pressing of the button 2704, the user manually set the device configuration information with the aid of dialog boxes 2701 to 2703.

In the dialog box 2701, the user can set the paper feed option of the image input/output apparatus 3. In the dialog box 2702, the user can set the paper discharge option thereof. In the dialog box 2703, the user can designate the density threshold when the clear form file is superimposed. Further, reference numeral 2706 denotes a button for canceling the information designated on the dialog of FIG. 27 and then closing the dialog. Reference numeral 2705 denotes a button for saving the information designated on the dialog of FIG. 27 and then closing the dialog.

The description is continued below by referring to the flowchart of FIG. 22 again.

If the user sets a value of the density threshold, denoted by 2703, on the device setting dialog illustrated in FIG. 25, the printer driver 603 obtains the set value in S2207. It is, however, to be noted that a value of the density threshold, denoted by 2703, is not always set by the user on the device setting dialog illustrated in FIG. 25. Therefore, when the device configuration information cannot be acquired from the image input/output apparatus 3, the printer driver 603 determines in S2208 whether there is a manually set value of the density threshold.

If it is determined in S2208 that a value of the density threshold is manually set, the printer driver 603 advances the processing to S2205.

In S2205, the printer driver 603 defines the density of the information, which is to be drawn into the clear form file, to a value of "density threshold−1". Next, in S2206, the printer driver 603 draws the user designated information into the clear form file at the density, which has been defined in S2205, and then sends the clear form file to the image input/output apparatus 3. Thereafter, the printer driver 603 brings the processing of the flowchart of FIG. 22 to an end.

On the other hand, if it is determined in S2208 that the printer driver 603 cannot obtain a set value of the density threshold in any manners, the printer driver 603 advances the processing to S2209.

In S2209, the printer driver 603 draws the user designated information into the clear form file at a minimum density and sends the clear form file to the image input/output apparatus 3. The clear form file is thereby registered in the image input/output apparatus 3. For example, when the density is expressed in values of 0 to 255, the density of the user designated information drawn in S2209 is set to "1". After the end of the process in S2209, the printer driver 603 brings the processing of the flowchart of FIG. 22 to an end. The process of registering the clear form file is executed as described above.

<Printing of Clear Form File in which Registered Information is Embedded>

The following description is given of an actually registered image and an actually printed result of the clear form file into which the user designated information is drawn through the above-described procedures.

Figure 26:
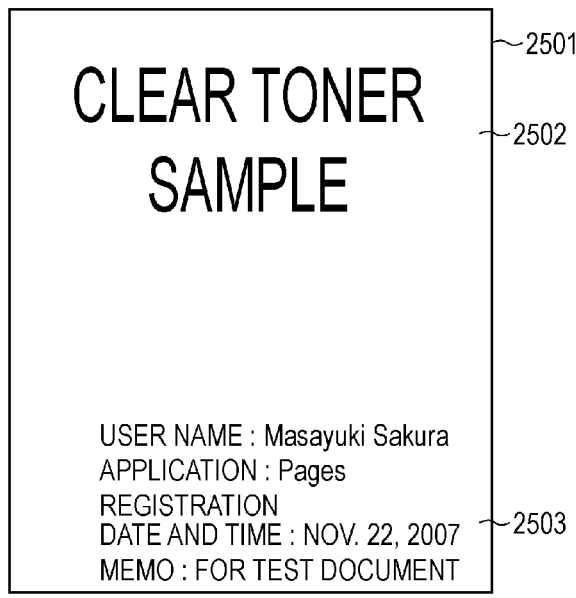
FIG. 26 illustrates actual data of the clear form file registered through the procedures illustrated in FIG. 22.

FIG. 26 illustrates actual data of the clear form file registered through the procedures illustrated in FIG. 22.

In FIG. 26, reference numeral 2501 denotes actual data of the clear form file registered through the above-described procedures.

Reference numeral 2502 denotes information indicating a region where the clear toner is to be added. In the illustrated example, the density of a character portion of "CLEAR TONER SAMPLE" is set to a maximum value of "255".

Reference numeral 2503 denotes information designated by the user when the printer driver 603 registers the clear form file. The user designated information, denoted by 2503, is drawn at a density of "99".

Figure 27:
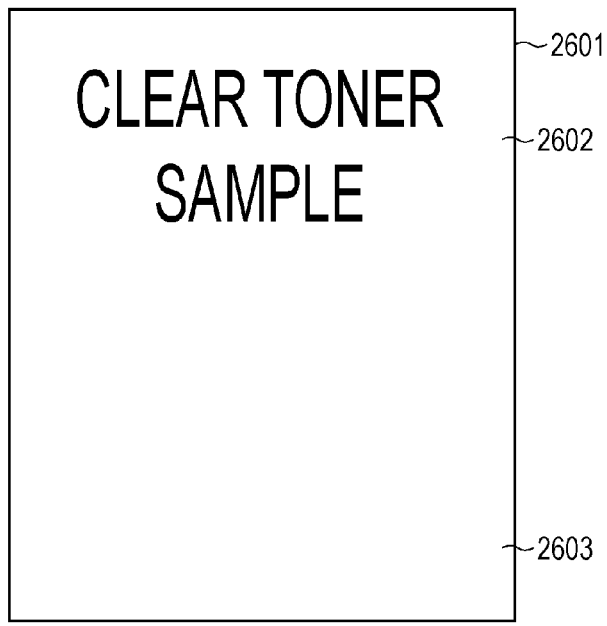
FIG. 27 illustrates the result of actual printing performed using the clear form file illustrated in FIG. 26.

FIG. 27 illustrates the result of actual printing performed by using the clear form file illustrated in FIG. 26.

In FIG. 27, reference numeral 2601 denotes the printed clear form file. Reference numeral 2602 denotes a portion where the clear toner is printed, and corresponds to the region information providing, as denoted by 2502 in FIG. 26, the characters "CLEAR TONER SAMPLE" at the density of "255".

The clear form file in the illustrated example contains the additional information drawn at the density of "99", which is denoted by 2503 in FIG. 26. In the illustrated example, however, because density values of not lower than the density threshold "240" provide the region where the clear toner is added, the additional information denoted by 2503 in FIG. 26 is not actually printed with the clear toner, as denoted by 2603 in FIG. 27, when the clear form superimposed printing is actually performed.

<Previewing of Clear Form File in which Registered Information is Embedded>

A previewing flow of the clear form file, into which the user designated information has been drawn through the above-described procedures, will be described below.

Figure 28:
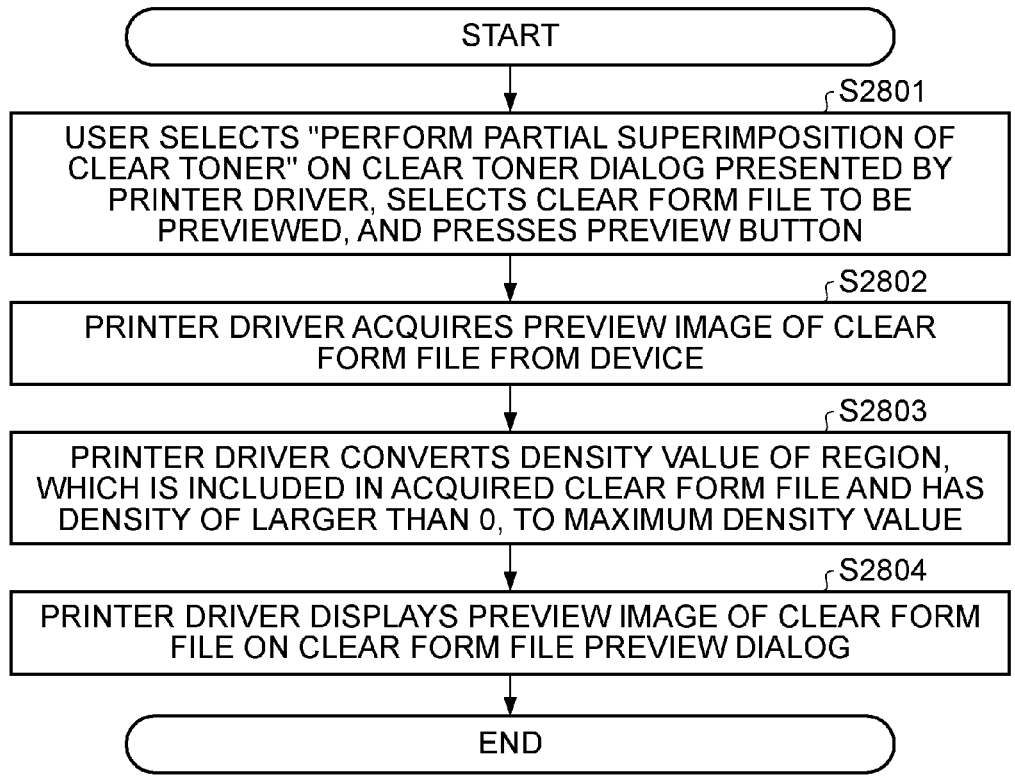
FIG. 28 is a flowchart illustrating procedures for previewing the registered clear form file.

FIG. 28 is a flowchart illustrating procedures for previewing the registered clear form file. The following description is made with reference to the flowchart of FIG. 28.

First, in S2801, the user selects an option "perform partial superimposition of clear toner" on a clear toner dialog which is displayed by the printer driver 603, thus selecting the clear form file to be previewed.

Figure 29:
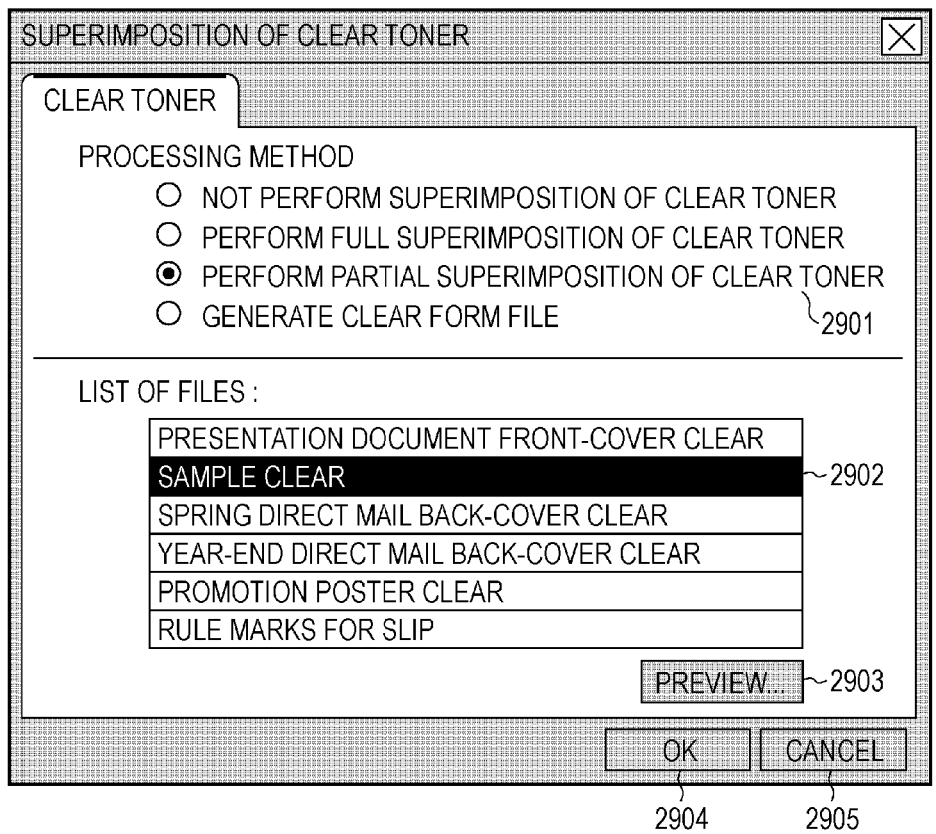
FIG. 29 illustrates a clear toner dialog displayed by the printer driver.

FIG. 29 illustrates the clear toner dialog displayed by the printer driver 603.

When, on the clear toner dialog, the user selects the option "perform partial superimposition of clear toner", denoted by 2901, as described above in connection with S2801 of FIG. 28, the printer driver 603 acquires a list of clear form files from the image input/output apparatus 3 by utilizing the dynamic configuration function. Further, the printer driver 603 displays the acquired list of clear form files in a control box 2902 in the form of a list.

Then, the user selects the clear form file, which is to be previewed, from the list of clear form files in the control box 2902. In the illustrated example, it is assumed that the file "sample clear" having been registered in the above description is selected. After the selection, the user presses a preview button 2903. Upon detecting the pressing of the preview button 2903, the printer driver 603 advances the processing to S2802.

In S2802, the printer driver 603 acquires a preview image of the clear form file from the image input/output apparatus 3. The preview image acquirable here is the image (2501) illustrated in FIG. 26.

In S2803, the printer driver 603 converts the density of a region, which is included in the clear form file acquired in S2802 and has a density value larger than 0, to a maximum density.

Figure 30:
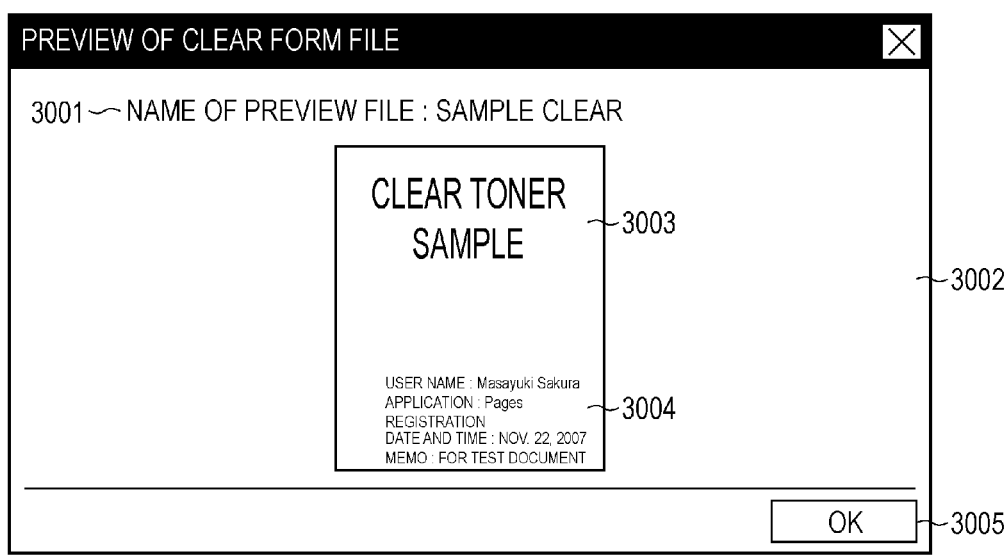
FIG. 30 illustrates a clear form file previewing dialog.

In S2804, the printer driver 603 displays the preview image of the clear form file, which has been acquired and subjected to the density conversion, on a clear form file preview dialog (FIG. 30).

FIG. 30 illustrates the clear form file previewing dialog. This dialog is displayed on the display unit 24 by the printer driver 603.

In FIG. 30, reference numeral 3001 denotes a text display area for displaying the name of the clear form file which has been designated by the user to be previewed.

Reference numeral 3002 denotes an area for displaying the preview image of the clear form file, which has been acquired and subjected to the density conversion by the printer driver 603. As seen from FIG. 30, the region information providing the characters "CLEAR TONER SAMPLE" at the density originally set to a maximum is displayed with the maximum density, as indicated by 3003.

Further, the user-designated additional information, which has been additionally drawn by the printer driver 603 at the time of registering the clear form file, is also displayed at the maximum density, as indicated by 3004, because of the density conversion performed in S2803 of FIG. 28. Stated another way, the user-designated additional information, which has been additionally drawn at the minimum density in S2209 of FIG. 22, is rather hard to read and confirm when provided by the ordinary printing or previewing. According to the preview display method described above, however, since the user-designated additional information, which has been additionally drawn at the minimum density, is also converted to the maximum density in S2803, it is possible to clearly confirm the additional information when previewed.

The preview dialog of FIG. 30 can be closed by pressing an OK button 3005.

With the procedures of this fourth exemplary embodiment, as described above, the user designated information can be embedded and drawn into the clear form file itself when the clear form file is registered. This enables the attributes of the clear form file to be more easily confirmed when the registered clear form file is confirmed later by previewing, for example.

APPLICATION EXAMPLES

The result of printing can be further confirmed based on the above-described preview function by using the clear form file which has already been acquired from the image input/output apparatus 3 and registered, or the clear form file for document data that is going to be printed.

On that occasion, a preview is displayed by using different colors to be able to separately discern the region (information) where the clear toner is actually printed and the region (information) where the clear toner is not printed when the printing is performed by using the above-described density threshold.

A preview can also be displayed by superimposing the clear form file with document data to be used when actually printed, such that the user can confirm the portion (region) where the clear toner is printed and the portion (region) where the clear toner is not printed.

In that case, the portion where the clear toner is printed and the portion where the clear toner is not printed can be displayed in a preview in two different colors, which are not used in the document data to be superimposed, such that the user can more easily recognize those portions.

Other Exemplary Embodiments

The first exemplary embodiment has been described above regarding the configuration that the test print is performed by causing the image input/output apparatus 3 to execute the clear form superimposing process based on the print data that has been sent from the printer driver 603.

The second exemplary embodiment has been described above regarding the configuration that the printer driver 603 displays a preview by causing the image input/output apparatus 3 to execute the clear form superimposing process based on the print data that has been sent from the printer driver 603.

The third exemplary embodiment has been described above regarding the configuration that the printer driver 603 performs the trial printing or displays a preview by obtaining the form data and the density threshold from the image input/output apparatus 3 and by executing the clear form superimposing process.

In addition to those exemplary embodiments, the present invention can also be implemented as follows. The printer driver 603 generates form data from document data prepared for the form data, and converts a color of the portion where the clear toner is coated, which portion is designated in the generated form data, to the first color and a color of the portion where the clear toner is not coated, which portion is designated in the generated form data, to the second color. Further, the printer driver 603 superimposes the converted form data with the document data, and sends the print job of the superimposed data to the image input/output apparatus 3, or displays a preview of the superimposed data. The document data prepared for the form data may be included in document data for which the clear toner printing is to be performed. For example, the document data prepared for the form data may be provided by even (or odd) pages or particular page (last page) of the document data for which the clear toner printing is to be performed.

The following configuration is also practicable. The printer driver 603 generates form data from document data prepared for the form data, and converts a color of the portion where the clear toner is coated, which portion is designated in the generated form data, to the first color and a color of the portion where the clear toner is not coated, which portion is designated in the generated form data, to the second color. Further, the printer driver 603 registers the converted form data in the image input/output apparatus 3. In addition, the printer driver 603 sends the print job, including information designating the registered form data as the form data to be used, the document data, and an instruction of printing the form data in a superimposed relation to the document data, to the image input/output apparatus 3.

As described above, when the test print of the clear toner printing is performed, the printer driver 603 used in the present invention defines the first color and the second color, which are discernible relative the colors designated in the document data. Further, the printer driver 603 instructs the image input/output apparatus 3 to print the portion where the clear toner is coated by the clear toner printing, which portion is designated in the form data, in the first color, and to print the portion where the clear toner is not coated by the clear toner printing, which portion is designated in the form data, in the second color.

Also, when the preview of the clear toner printing is displayed, the printer driver 603 defines the first color and the second color, which are discernible relative to the colors designated in the document data. Further, the printer driver 603 executes control so as to display the portion where the clear toner is coated by the clear toner printing, which portion is designated in the form data, in the first color, and to display the portion where the clear toner is not coated by the clear toner printing, which portion is designated in the form data, in the second color.

When the document data includes a plurality of pages, the printer driver 603 may define the first color and the second color per page of the document data.

The incidental information (827 in FIG. 8) may be superimposed with the document data in any of the printer driver 603 and the image input/output apparatus 3.

The first color and the second color may be given by color information providing transparent colors.

When colors undesignated in the document data are not present in the color list (14-b in FIG. 14), the colors designated in the document data are converted to define, as the first color and the second color, colors which are not designated in the converted document data.

Moreover, when the test print of the clear toner printing is performed, the image input/output apparatus 3 (or the printer driver 603) may extract only contours of objects in the form data and perform overlay printing of the extracted contours with the document data.

When the preview of the clear toner printing is displayed, the printer driver 603 may extract only contours of objects in the form data and display the preview in an overlay relation to the document data.

In generating the form file, if it is determined that the clear form covers the entire surface, the printer driver 603 may delete objects in the form file and add information indicating that the form covers the entire surface of the document data. Further, in executing the color conversion (color correction) of the document data, the printer driver 603 may execute the color conversion such that objects in the document data are printed only with CMY, and may designate the first color to black (i.e., the use of a black toner).

While several exemplary embodiments have been described above, the present invention can be implemented as, e.g., a system, an apparatus, a method, a program, and a storage medium. Concretely, the present invention may be applied to a system including a plurality of apparatuses and devices, or to an apparatus formed by a single unit of equipment. One example such a system is a computer system including a printer, a facsimile, a PC, a server, and a client.

As a matter of course, the configurations and the contents of the above-described various data are not limited to the illustrated examples, and those data may have other various configurations and the contents depending on the use and the purpose.

Organically combined configurations of the above-described exemplary embodiments and modifications thereof are all involved in the scope of the present invention.

According to the exemplary embodiments, as described above, the printer driver 603 analyzes colors designated for objects in document data (i.e., data for a plurality of color toners used in the printing), and automatically defines the first color and the second color, which differ from each other and which are not used in the objects. Further, the printer driver 603 sets the first color as a color used to print a portion designated in the form file (i.e., clear-toner data printed by using the clear toner) where the clear toner is coated. Also, the printer driver 603 sets the second color as a color used to print a portion designated in the form file where the clear toner is not coated. Further, the printer driver 603 sends a color information conversion command for the form data to the image input/output apparatus 3 together with the document data, and the image input/output apparatus 3 outputs the document data and the form data in a superimposed manner by using the first and second color information.

With the above-described configuration, the trial printing function with good legibility can be realized without employing the clear toner printing. In the related art, the clear toner printing often causes the result not intended by the operator for the reason that the clear toner is not coated on objects in the registered clear form file, which have densities lower than the density threshold. Another problem is that, when the clear toner printing is actually performed, the printing operation is additionally counted for billing and the cost is increased. Those problems can be overcome with the above-described configuration.

While, in the above-described exemplary embodiments, the term "document data" is used to express the color-toner data that is printed by using a plurality of color toners, the color-toner data may be any type of data so long as it is data printed by using one or more color toners.

Further, while the exemplary embodiments have been described above in connection with the case of using, e.g., the clear form as the clear-toner data that is printed by using the clear toner, the clear-toner data may be any type of data so long as it is data printed by using the clear toner.

Though not specifically illustrated in FIG. 6, the memory map may additionally store not only information for managing a group of programs stored in a storage medium, such as version information and the name of a creator, but also information depending on, e.g., the OS on the program reading side, such as icons displaying programs in a way discernible from one another.

In addition, data subordinate to various programs are also managed in a directory of the memory map. The memory map may further store a program for installing the various programs into a computer, and/or a program for decompressing an installed program when the installed program is compressed.

The functions illustrated in the flowcharts according to the exemplary embodiments may be executed by a host computer in accordance with an externally installed program. In this respect, the present invention also involves a case where an information group, including programs, is supplied to the output apparatus from a storage medium, such as a CD-ROM, a flash memory and a FD, or an external storage medium via a network.

The present invention also involves the following case. A storage medium recording software program code for realizing the functions of the above-described exemplary embodiments is supplied to a system or an apparatus. Then, a computer (CPU or MPU) incorporated in the system or the apparatus reads and executes the program code stored in the storage medium, thereby achieving the functions of the above-described exemplary embodiments.

Therefore, the program code read out from the storage medium realizes the novel functions of the present invention, and the storage medium storing the program code constitutes the present invention.

In that case, the program can have various forms, e.g., object code, a program executed by an interpreter, and script data supplied to the OS, so long as the program has the required functions.

The storage medium for supplying the program can be, e.g., a flexible disk, a hard disk, a CD-R, a nonvolatile memory card, a ROM, and a DVD.

Thus, the program code read out from the storage medium realizes the functions of the above-described exemplary embodiments, and the storage medium storing the program code constitutes the present invention.

Further, the program can be supplied through the steps of connecting a client computer to a homepage on the Internet by using a browser in the client computer, and downloading the program implementing the features of the present invention in itself to a recording medium, e.g., a hard disk, from the connected homepage. The program can also be supplied by downloading a file, which is compressed and which has the automatic installing function, to a recording medium, e.g., a hard disk, from the connected homepage. As another method, program code constituting the program implementing the features of the present invention can be divided into a plurality of files, and those files can be downloaded from different homepages. In other words, the present invention involves a WWW server and an FTP server for downloading, to a plurality of users, a program file which realizes the functions and the processing executed in the present invention with a computer.

Alternatively, the program can be supplied as follows. The program implementing the features of the present invention is encrypted and stored in a storage medium, e.g., CD-ROM, for distribution to users. The user who clears predetermined conditions is allowed to download key information necessary for decryption from a homepage via the Internet. The user decrypts and executes the encrypted program by using the downloaded key information, thus installing the program into the computer.

The functions of the above-described exemplary embodiments are realized with a computer executing the read program code. Also, the functions of the above-described exemplary embodiments can be realized in such a manner that, for example, an OS operating on the computer executes a part or the whole of actual processing in accordance with instructions from the read program code.

In addition, the functions of the above-described exemplary embodiments can be realized as follows. The program code read out from a storage medium is written in a memory which is incorporated in a function expansion board inserted in a computer or in a function expansion unit connected to the computer. Then, a CPU or the like incorporated in the function expansion board or the function expansion unit executes a part or the whole of actual processing in accordance with instructions from the program code written in the memory.

The present invention can be applied to not only a system including a plurality of apparatuses and devices, but also an apparatus formed by a single unit of equipment. Further, the present invention can be applied to the case where the features of the exemplary embodiments are achieved by supplying the program to such a system or apparatus. In that case, the system or the apparatus can provide the advantages of the present invention by reading the program, which is expressed by software implementing the features of the exemplary embodiments of the present invention, into the system or the apparatus from a storage medium storing the program.

The present invention is not limited to the above-described exemplary embodiments, and various modification (including organic combinations of the exemplary embodiments) can be practiced based on the purport of the present invention. Those modifications are not excluded from the scope of the present invention.

While the present invention has been described above in connection with various examples and exemplary embodiments, it is to be understood by those skilled in the art that the purport and the scope of the present invention are not restricted by specific descriptions in this specification.

The scope of the following claims is to be accorded the broadest interpretation so as to encompass all the exemplary embodiments, modifications, and equivalent structures and functions, as well as combinations thereof.

This application claims the benefit of Japanese Patent Application No. 2008-196369 filed Jul. 30, 2008, which is hereby incorporated by reference herein in its entirety.

What is claimed is:

1. A printing control apparatus instructing a printing apparatus to perform clear toner printing in which color-toner data printed by using a plurality of color toners and clear-toner data printed by using a clear toner are printed in a superimposed relation, the printing control apparatus comprising:
   an accepting unit configured to accept an instruction for a test print of the clear toner printing; and
   a control unit configured, upon accepting the instruction for the test print by the accepting unit, to define a first color and a second color, which differ from each other and which are discernible relative to colors designated in the color-toner data, and to issue a printing instruction to the printing apparatus such that a portion designated in the clear-toner data where the clear toner is coated by the clear toner printing is printed in the first color, and a portion designated in the clear-toner data where the clear toner is not coated by the clear toner printing is printed in the second color.

2. The printing control apparatus according to claim 1, wherein the portion designated in the clear-toner data where the clear toner is not coated by the clear toner printing, the portion being output in the second color, is a portion for which the printing is processed in the printing apparatus not to coat the clear toner thereon by the clear toner printing in accordance with a preset density threshold.

3. The printing control apparatus according to claim 1, wherein the control unit issues an instruction to print incidental information together, the incidental information including information indicating that the portion where the clear toner is coated is printed in the first color, and information indicating that the portion where the clear toner is not coated is printed in the second color.

4. The printing control apparatus according to claim 1, wherein the control unit determines a selected sheet type, defines colors each having low brightness as the first color and the second color when the selected sheet type is glossy paper, and defines colors each having high brightness as the first color and the second color when the selected sheet type is not glossy paper.

5. The printing control apparatus according to claim 1, wherein the control unit instructs the printing apparatus to change the sheet type to plain paper.

6. The printing control apparatus according to claim 1, wherein the control unit sends a print job to the printing apparatus, the print job including the color-toner data, information designating the test print of the clear toner printing, information designating the clear-toner data to be used from a data group which is registered in the printing apparatus, information designating that the portion where the clear toner is coated is printed in the first color, and information designating that the portion where the clear toner is not coated is printed in the second color.

7. The printing control apparatus according to claim 1, wherein the control unit acquires the clear-toner data to be used from the data group which is registered in the printing apparatus, converts a color of the portion designated in the acquired clear-toner data where the clear toner is coated to the first color, converts a color of the portion designated in the acquired clear-toner data where the clear toner is not coated to the second color, and sends a print job, which is generated based on the converted clear-toner data and the color-toner data, to the printing apparatus.

8. The printing control apparatus according to claim 1, wherein the control unit generates the clear-toner data based on data from an application, converts a color of the portion designated in the generated clear-toner data where the clear toner is coated to the first color, converts a color of the portion designated in the generated clear-toner data where the clear toner is not coated to the second color, and sends a print job, which is generated based on the converted clear-toner data and the color-toner data, to the printing apparatus.

9. The printing control apparatus according to claim 1, wherein the control unit generates the clear-toner data based on the color-toner data and registers the generated clear-toner data in the printing apparatus.

10. A printing control apparatus instructing a printing apparatus to perform clear toner printing in which color-toner data printed by using a plurality of color toners and clear-toner data printed by using a clear toner are printed in a superimposed relation, the printing control apparatus comprising:
    an accepting unit configured to accept an instruction for preview display of the clear toner printing; and
    a control unit configured, upon accepting the instruction for the preview display by the accepting unit, to define a first color and a second color, which differ from each other and which are discernible relative to colors designated in the color-toner data, and to execute display control such that a portion designated in the clear-toner data where the clear toner is coated by the clear toner printing is displayed in the first color, and a portion designated in the clear-toner data where the clear toner is not coated by the clear toner printing is displayed in the second color.

11. The printing control apparatus according to claim 10, wherein the control unit executes control to display incidental information to be displayed together, the incidental information including information indicating that the portion where the clear toner is coated is printed in the first color, and information indicating that the portion where the clear toner is not coated is printed in the second color.

12. The printing control apparatus according to claim 10, wherein the control unit sends a job to the printing apparatus, the job including the color-toner data, information indicating the preview display of the clear toner printing, information designating the clear-toner data to be used from a data group which is registered in the printing apparatus, information designating that the portion where the clear toner is coated is displayed in the first color, and information designating that the portion where the clear toner is not coated is displayed in the second color, and the control units displays a preview by acquiring, from the printing apparatus, data generated based on both the clear-tone data, which has been generated based on the sent job, and the color-toner data.

13. The printing control apparatus according to claim 10, wherein the control unit acquires the clear-toner data to be used from the data group which is registered in the printing apparatus, converts a color of a portion designated in the acquired clear-toner data where the clear toner is coated to the first color, converts a color of a portion designated in the acquired clear-toner data where the clear toner is not coated to the second color, and displays a preview of data generated based on the converted clear-toner data and the color-toner data.

14. The printing control apparatus according to claim 10, wherein the control unit generates the clear-toner data based on data from an application, converts a color of a portion designated in the generated clear-toner data where the clear toner is coated to the first color, converts a color of a portion designated in the generated clear-toner data where the clear toner is not coated to the second color, and displays a preview of data generated based on the converted clear-toner data and the color-toner data.

15. The printing control apparatus according to claim 14, wherein the printing apparatus executes processing not to coat the clear toner on a portion having a density lower than a preset density threshold, and
    the control unit obtains the density threshold from the printing apparatus and determines, based on the obtained density threshold, the portion where the clear toner is coated and the portion where the clear toner is not coated.

16. A printing apparatus comprising:
    a receiving unit configured to receive a print job for a test print of printing using a clear toner; and
    a printing unit configured, when the printing using the clear toner is performed based on the print job received by the receiving unit, to perform the clear toner printing by using a color toner instead of the clear toner such that a portion where the clear toner is coated and a portion where the clear toner is not coated are discernible from each other.

17. The printing apparatus according to claim 16, wherein the printing using the clear toner is clear toner printing in which color-toner data printed by using a plurality of color toners and clear-toner data printed by using the clear toner are printed in a superimposed relation.

18. The printing apparatus according to claim 16, wherein the control unit prints incidental information together, the incidental information including information indicating a color used to print the portion where the clear toner is coated, and information indicating a color used to print the portion where the clear toner is not coated.

19. A method for use in a printing control apparatus instructing a printing apparatus to perform clear toner printing in which color-toner data printed by using a plurality of color toners and clear-toner data printed by using a clear toner are printed in a superimposed relation, the method comprising the steps of:
    accepting an instruction for a test print of the clear toner printing; and
    upon accepting the instruction for the test print, defining a first color and a second color, which differ from each other and which are discernible relative to colors designated in the color-toner data, and issuing a printing instruction to the printing apparatus such that a portion designated in the clear-toner data where the clear toner is coated by the clear toner printing is printed in the first color, and a portion designated in the clear-toner data where the clear toner is not coated by the clear toner printing is printed in the second color.

20. A method for use in a printing control apparatus instructing a printing apparatus to perform clear toner printing in which color-toner data printed by using a plurality of color toners and clear-toner data printed by using a clear toner are printed in a superimposed relation, the method comprising the steps of:

accepting an instruction for preview display of the clear toner printing; and upon accepting the instruction for the preview display, defining a first color and a second color, which differ from each other and which are discernible relative to colors designated in the color-toner data, and executing display control such that a portion designated in the clear-toner data where the clear toner is coated by the clear toner printing is displayed in the first color, and a portion designated in the clear-toner data where the clear toner is not coated by the clear toner printing is displayed in the second color.

21. A method for use in a printing apparatus, the method comprising the steps of:

receiving a print job for a test print of printing using a clear toner; and when the printing using the clear toner is performed based on the received print job, performing the clear toner printing by using a color toner instead of the clear toner such that a portion where the clear toner is coated and a portion where the clear toner is not coated are discernible from each other.

22. A computer readable storage medium on which is stored a computer program for making a computer execute a method for instructing a printing apparatus to perform clear toner printing in which color-toner data printed by using a plurality of color toners and clear-toner data printed by using a clear toner are printed in a superimposed relation, the method comprising the steps of:

accepting an instruction for a test print of the clear toner printing; and upon accepting the instruction for the test print, defining a first color and a second color, which differ from each other and which are discernible relative to colors designated in the color-toner data, and issuing a printing instruction to the printing apparatus such that a portion designated in the clear-toner data where the clear toner is coated by the clear toner printing is printed in the first color, and a portion designated in the clear-toner data where the clear toner is not coated by the clear toner printing is printed in the second color.

23. A computer readable storage medium on which is stored a computer program for making a computer execute a method for instructing a printing apparatus to perform clear toner printing in which color-toner data printed by using a plurality of color toners and clear-toner data printed by using a clear toner are printed in a superimposed relation, the method comprising the steps of:

accepting an instruction for preview display of the clear toner printing; and upon accepting the instruction for the preview display, defining a first color and a second color, which differ from each other and which are discernible relative to colors designated in the color-toner data, and executing display control such that a portion designated in the clear-toner data where the clear toner is coated by the clear toner printing is displayed in the first color, and a portion designated in the clear-toner data where the clear toner is not coated by the clear toner printing is displayed in the second color.

24. A printing control apparatus instructing a printing apparatus to perform clear toner printing using a plurality of color toners and a clear toner, the printing control apparatus comprising:

a display unit configured to control display of a screen for, when the clear toner printing is performed, prompting a user to select one of full clear designation that printing using the clear toner is performed on an entire surface of a printed page, and partial clear designation that the printing using the clear toner is performed on part of the printed page, wherein upon the partial clear designation being selected on the screen, the display unit acquires data files registered in the printing apparatus with a dynamic configuration function and displays a list of the acquired data files such that a data file used in the clear toner printing can be selected from the list;

a generation unit configured, when the full clear designation is selected on the screen displayed by the display unit, to generate a job including color-toner data printed by using the color toners and information indicating the full clear designation, and when the partial clear designation is selected on the screen displayed by the display unit, to generate a job including the color-toner data, information indicating the partial clear designation, and identification information of the data file which has been selected on the screen displayed by the display unit to be used in the clear toner printing; and a transmission unit configured to send the job generated by the generation unit to the printing apparatus, wherein when the job sent by the transmission unit includes the information instructing the partial clear designation, the printing apparatus reads the data file corresponding to the identification information of the data file which is designated in the job to be used in the clear toner printing, and performs the printing using the clear toner, based on the read data file, in a superimposed relation to a print which is printed by the printing using the plurality of color toners based on the color-toner data included in the job.

25. A method for use in a printing control apparatus instructing a printing apparatus to perform clear toner printing using a plurality of color toners and a clear toner, the method comprising the steps of:

controlling display of a screen for, when the clear toner printing is performed, prompting a user to select one of full clear designation that printing using the clear toner is performed on an entire surface of a printed page, and partial clear designation that the printing using the clear toner is performed on part of the printed page, wherein when the partial clear designation is selected on the screen, a list of data files registered in the printing apparatus are displayed such that a data file used in the clear toner printing can be selected from the list;

when the full clear designation is selected on the displayed screen, generating a job including color-toner data printed by using the color toners and information indicating the full clear designation, and when the partial clear designation is selected on the displayed screen, generating a job including the color-toner data, information indicating the partial clear designation, and information regarding the data file which has been selected on the displayed screen to be used in the clear toner printing; and sending the generated job to the printing apparatus.

26. A computer readable storage medium on which is stored a computer program for making a computer execute a method for method for instructing a printing apparatus to perform clear toner printing using a plurality of color toners and a clear toner, the method comprising the steps of:

controlling display of a screen for, when the clear toner printing is performed, prompting a user to select one of full clear designation that printing using the clear toner is performed on an entire surface of a printed page, and partial clear designation that the printing using the clear toner is performed on part of the printed page, wherein when the partial clear designation is selected on the screen, a list of data files registered in the printing apparatus are displayed such that a data file used in the clear toner printing can be selected from the list;

when the full clear designation is selected on the displayed screen, generating a job including color-toner data printed by using the color toners and information indicating the full clear designation, and when the partial clear designation is selected on the displayed screen, generating a job including the color-toner data, information indicating the partial clear designation, and information regarding the data file which has been selected on the displayed screen to be used in the clear toner printing; and sending the generated job to the printing apparatus.

* * * * *